(12) United States Patent
    Ichikawa et al.

(10) Patent No.: US 8,979,656 B2
(45) Date of Patent: Mar. 17, 2015

(54) COMMUNICATION GAME SYSTEM, GAME DEVICE, GAME IMPLEMENTATION METHOD, PROGRAM AND RECORDING MEDIUM

(75) Inventors: Masanori Ichikawa, Tokyo (JP); Toshiyuki Uehara, Tokyo (JP); Akihito Ota, Tokyo (JP); Kei Shimo, Kanagawa (JP); Toshihiko Machita, Kanagawa (JP); Kunihiro Sasagawa, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 1939 days.

(21) Appl. No.: 11/745,699

(22) Filed: May 8, 2007

(65) Prior Publication Data
    US 2007/0281791 A1    Dec. 6, 2007

(30) Foreign Application Priority Data
    May 22, 2006 (JP) ................. 2006-141883

(51) Int. Cl.
    *A63F 13/00*    (2014.01)
    *A63F 13/31*    (2014.01)
    (Continued)

(52) U.S. Cl.
    CPC .............. *A63F 13/10* (2013.01); *A63F 13/12* (2013.01); *A63F 2300/636* (2013.01);
    (Continued)

(58) Field of Classification Search
    CPC ......... A63F 13/10; A63F 13/12; A63F 13/49; A63F 13/493; A63F 13/497; A63F 13/48; A63F 13/30; A63F 13/31; A63F 13/34; A63F 2300/408; A63F 2300/63; A63F 2300/634; A63F 2300/554; A63F 2300/402; A63F 2300/204; A63F 2300/5533; A63F 2300/407

USPC ...................................... 463/40–42
See application file for complete search history.

(56) References Cited

U.S. PATENT DOCUMENTS 6,676,524 B1 *  1/2004  Botzas ........................ 463/43
6,939,232 B2 *  9/2005  Tanaka et al. ................ 463/37
(Continued)

FOREIGN PATENT DOCUMENTS

JP        1-195544      8/1989
JP        2002-292122   10/2002
WO    WO 2004052483 A1 *  6/2004

OTHER PUBLICATIONS

Civilization IV User Manual. 2K Games. Released 2005. pp. 16-19, 172-173, 224.*

(Continued)

*Primary Examiner* — William H McCulloch, Jr.
(74) *Attorney, Agent, or Firm* — Greenblum & Bernstein, P.L.C.

(57) ABSTRACT

A game system includes multiple game machines which implement a game by alternating turns. Each game machine implements the game on its turn, and transmits game progress information to the other game machines. The game is implemented in accordance with the transmitted game progress information. A host game machine of the game machines transmits turn determination information to the other game machines, and receives turn completion information from each of the other game machines. When the turn confirmation information is not returned from one of the other game machines, the host game machine recognizes that communication has been cut off. When the communication has been cut off, the host game machine functions as a substitute for the cut off game machine.

20 Claims, 9 Drawing Sheets

(51) Int. Cl.
*A63F 13/34* (2014.01)
*A63F 13/45* (2014.01)
*A63F 13/49* (2014.01)
*A63F 13/493* (2014.01)
*A63F 13/497* (2014.01)
*A63F 13/48* (2014.01)
*A63F 13/40* (2014.01)
*A63F 13/30* (2014.01)
*A63F 13/46* (2014.01)

(52) U.S. Cl.
CPC .......... *A63F 13/49* (2014.09); *A63F 13/493* (2014.09); *A63F 13/497* (2014.09); *A63F 13/48* (2014.09); *A63F 13/30* (2014.09); *A63F 13/31* (2014.09); *A63F 13/34* (2014.09); *A63F 2300/408* (2013.01); *A63F 2300/634* (2013.01); *A63F 2300/63* (2013.01); *A63F 2300/554* (2013.01); *A63F 2300/5533* (2013.01); *A63F 2300/407* (2013.01); *A63F 2300/204* (2013.01); *A63F 2300/402* (2013.01)
USPC .................. 463/42; 463/40; 463/41

(56) References Cited

U.S. PATENT DOCUMENTS

| | | | | |
|---|---|---|---|---|
| 7,037,196 B2* | 5/2006 | Kobayashi et al. | ............. | 463/29 |
| 7,559,834 B1* | 7/2009 | York | ................. | 463/2 |
| 7,887,418 B2* | 2/2011 | Kaminagayoshi | ............. | 463/42 |
| 7,938,724 B2* | 5/2011 | Kamiyama et al. | ............. | 463/31 |
| 7,951,007 B2* | 5/2011 | Wolinsky | ............. | 463/42 |
| 8,167,712 B2* | 5/2012 | Sarkar et al. | ............. | 463/29 |
| 8,506,410 B2* | 8/2013 | Fujisawa et al. | ............. | 463/42 |
| 2002/0142818 A1 | 10/2002 | Nakatsuka et al. | | |
| 2002/0160833 A1* | 10/2002 | Lloyd et al. | ............. | 463/29 |
| 2003/0177187 A1* | 9/2003 | Levine et al. | ............. | 709/205 |
| 2005/0043097 A1* | 2/2005 | March et al. | ............. | 463/42 |
| 2006/0154710 A1* | 7/2006 | Serafat | ............. | 463/1 |
| 2007/0032281 A1 | 2/2007 | Nakatsuka et al. | | |
| 2007/0281791 A1* | 12/2007 | Ichikawa et al. | ............. | 463/42 |
| 2008/0045285 A1* | 2/2008 | Fujito | ............. | 463/9 |
| 2008/0045343 A1* | 2/2008 | Sauberman | ............. | 463/42 |
| 2008/0305463 A1* | 12/2008 | Ichikawa | ............. | 434/257 |
| 2009/0042646 A1* | 2/2009 | Sarkar et al. | ............. | 463/29 |
| 2009/0298587 A1* | 12/2009 | Acharya et al. | ............. | 463/35 |
| 2009/0299960 A1* | 12/2009 | Lineberger | ............. | 707/3 |
| 2010/0178973 A1* | 7/2010 | Snoddy et al. | ............. | 463/19 |
| 2011/0172018 A1* | 7/2011 | Premutico | ............. | 463/42 |
| 2011/0263333 A1* | 10/2011 | Dokei et al. | ............. | 463/42 |
| 2012/0052941 A1* | 3/2012 | Mo | ............. | 463/30 |
| 2012/0129607 A1* | 5/2012 | Jabara et al. | ............. | 463/41 |
| 2012/0190443 A1* | 7/2012 | Fujisawa et al. | ............. | 463/31 |
| 2012/0190444 A1* | 7/2012 | Fujisawa et al. | ............. | 463/31 |

OTHER PUBLICATIONS

Sid Meier's Civilization IV. Metacritic.com. Accessed Feb. 26, 2013. <http://www.metacritic.com/game/pc/sid-meiers-civilization-iv>.*
U.S. Appl. No. 11/755,405 to Fujito, filed May 30, 2007.
English language abstract of JP 2002-292122.
English language abstract of JP 1-195544.

* cited by examiner

GAME PROGRESS INFORMATION, TURN DETERMINATION INFORMATION

TURN COMPLETION INFORMATION

TURN CONFIRMATION INFORMATION

GAME PROGRESS INFORMATION, TURN DETERMINATION INFORMATION

TURN COMPLETION INFORMATION

TURN CONFIRMATION INFORMATION

GAME PROGRESS INFORMATION, TURN DETERMINATION INFORMATION

GAME PROGRESS INFORMATION, TURN DETERMINATION INFORMATION

TURN COMPLETION INFORMATION

TURN CONFIRMATION INFORMATION

GAME PROGRESS INFORMATION, TURN DETERMINATION INFORMATION (SUBSTITUTE)

TURN COMPLETION INFORMATION

TURN CONFIRMATION INFORMATION

GAME PROGRESS INFORMATION, TURN DETERMINATION INFORMATION

GAME PROGRESS INFORMATION

TURN DETERMINATION INFORMATION

GAME COMPLETION

CUT OFF OCCURRENCE INFORMATION

CUT OFF CONFIRMATION INFORMATION

GAME PROGRESS INFORMATION,
TURN DETERMINATION INFORMATION

TURN COMPLETION INFORMATION

COMMUNICATION GAME SYSTEM, GAME DEVICE, GAME IMPLEMENTATION METHOD, PROGRAM AND RECORDING MEDIUM

CROSS REFERENCE TO RELATED APPLICATION

The present disclosure relates to subject matter contained in Japanese Patent Application No. 2006-141883, filed on May 22, 2006, the disclosure of which is expressly incorporated herein by reference in its entirety.

BACKGROUND OF THE INVENTION

1. Technical Field

The present invention relates to an execution of a game implemented by users of three or more terminal devices alternately carrying out a prescribed game input for a game progression.

2. Related Art

To date, there being a game machine which transmits and receives information by means of a wireless communication function between itself and one or more other game machine, there has been a communication game system which implements a game by connecting two or more of this kind of game machine to each other (for example, refer to JP-A-2002-292122). Naturally, the communication between this kind of game machine not being guaranteed to be in an intact condition, there may appear a game machine in which the communication with another game machine is cut off due to a movement to an area removed from the other game machine, a dead battery, a failure of a device, or an effect of noise or the like occurring in a periphery.

In the event that the communication is cut off in a portion of the game machines which have been carrying out the game thus far, there has been no option but to continue the game with only the remaining game machines in which the communication is still in a connected condition. In this case, players participating in the game are reduced by one. As there are many of this kind of game in which an enjoyment of the game lies in it being implemented by a large number of players participating, each player, even in this kind of case, feels a desire to continue the game smoothly, without reducing the number of players participating.

However, a communication game system which executes this kind of game machine, as a hardware configuration, is a network system in which a plurality of computer devices are connected to each other in such a way that the communication is possible. That the communication of one portion of the game machines has been cut off means only that one portion of the computer devices in the network system has crashed. Although not thinking especially of the execution of the game, a duplex system which has an active system and a standby system can be considered for continuing a process even when one portion of the computer devices has crashed (for example, refer to JP-A-1-195544).

However, in order to configure a kind of duplex system of JP-A-1-195544, it is necessary to prepare a standby system game machine which is completely unnecessary when a game is progressing normally. Also, even in the event that the standby system game machine can be prepared, in the event that a player of a game machine in which a communication has been cut off has disappeared, or the like, there is a problem of who is to play on the standby system game machine. Depending on a nature of a game being executed, in the event that one person plays the game as a plurality of players, the game itself is not essentially established.

Meanwhile, even by severing the game machine in which the communication has been cut off and continuing the game with only the remaining game machines, depending on the nature of the game being executed, it may happen that the game itself is not essentially established hereon. For example, it is a case of a mah-jong game or the like in which a number of players is fixed. In this kind of case, even in a condition in which the remaining game machines can still carry out the communication between each other, there has been no option but to complete the game at that point.

SUMMARY OF THE INVENTION

The invention has an object, in a communication game system configured of three or more terminal devices, of enabling a continuation of a game with the remaining terminal devices when a communication of a portion of the terminal devices has been cut off, without preparing a surplus terminal device.

In order to achieve the heretofore described object, a communication game system according to a first aspect of the invention is a communication game system, configured with at least three terminal devices which carry out a communication between each other, in which a user of each terminal device implements a game by alternately carrying out a prescribed game input for a game progression, each of the at least three terminal devices comprising: an order determiner which determines, in accordance with information received via a communication with other terminal devices, whether a turn has come to carry out a game input in its own terminal device; an inputter which carries out the game input, in accordance with an operation of the user of the terminal device, when it is determined by the order determiner that its own turn has come; a game information transmitter which transmits input information, including information relating to the game input transmitted from the inputter, to the other terminal devices; a game information receptor which receives other input information relating to another game input that has been input into one of the other terminal devices; and a game implementor which implements the game in accordance with the game input, or the received other input information, every time the game input is carried out by the inputter, or every time the game information receptor receives the other input information, and a specified terminal device of the at least three terminal devices comprising: a communication condition determiner which determines whether there exists, among the other terminal devices apart from the specified terminal device, a cut off terminal device, in which communication has been cut off from the other terminal devices; a substitute turn determiner which determines, when it is determined by the communication condition determiner that there exists the cut off condition in the cut off terminal device, whether it is a turn of the cut off terminal device to carry out a game input; a substitute inputter which, when it is determined by the substitute turn determiner that it is the turn of the cut off terminal device to carry out the game input, carries out a substitute game input for the cut off terminal device; and a substitute information transmitter which transmits substitute input information relating to the substitute game input carried out by the substitute inputter, as input information relating to the substitute game input in the cut off terminal device, to the other terminal devices, apart from the cut off terminal device, wherein the game implementor in the specified terminal device, when it is determined that there exists the cut off condition in the cut off terminal device, further implements the game in accordance with the substitute game input carried out by the substitute inputter, and wherein the other terminal devices, apart from the specified terminal device, further include a substitute information receptor which receives the substitute input information transmitted from the substitute information transmitter, the game implementor in each of the other terminal devices further implements the game in accordance with the substitute input information received by the substitute information receptor.

In the heretofore described communication game system, it is determined in the specified terminal device whether or not there exists, among the other terminal devices, one in which the communication has been cut off and, in the event that there exists the cut off condition terminal device in which the communication has been cut off, the game input in the relevant cut off condition terminal device is carried out instead in the relevant specified terminal device. In the event that the game input in the cut off condition terminal device is carried out instead in the specified terminal device, the game is implemented in the relevant specified terminal device in accordance with the substituted game input, and in the other terminal devices in accordance with the information relating to the substituted game input transmitted from the relevant specified terminal device.

For this reason, even in the event that there exists the cut off condition terminal device in which the communication with the specified terminal device has been cut off, it is possible to continue the game between the relevant specified terminal device and the other remaining terminal devices, maintaining a condition before the communication has been cut off. Also, as the game input of the cut off condition terminal device is substituted for by the specified terminal device which has originally carried out the game, it is not necessary to prepare a separate terminal device, which takes the place of the cut off condition terminal device, in order to continue the game maintaining the condition before the communication has been cut off.

In the heretofore described communication game system, it is possible to arrange that the other terminal devices, apart from the specified terminal device, each further include a confirmation information transmitter which transmits confirmation information to the specified terminal device every time the game is implemented by the game implementor, and the specified terminal device further includes a confirmation information receptor which receives the confirmation information transmitted from each of the other terminal devices, wherein the communication condition determiner, when there is another terminal device in which the confirmation information has not been received by the confirmation information receptor, determines the other terminal device in which the relevant confirmation information has not been received to be the cut off terminal device.

In this case, just by the simple configuration of transmitting and receiving the confirmation information, it is possible to determine whether or not there exists, among the terminal devices apart from the specified terminal device, the cut off condition terminal device in which the communication has been cut off.

Also, in this case, it is possible to arrange that the specified terminal device further includes an order information transmitter which, when the confirmation information is received from all of the other terminal devices, transmits order information to another terminal device which is next in order to carry out a game input, and the other terminal devices, apart from the specified terminal device, each further include an order information receptor which receives the order information transmitted from the order information transmitter, wherein the order determiner in the other terminal devices, apart from the specified terminal device, in accordance with the order information received by the order information receptor, determines whether the turn has come to carry out the game input in its own terminal device.

In this case, the other terminal devices apart from the specified terminal device, depending on whether or not the order information from the specified terminal device has been received, can judge whether or not the turn has come to carry out the game input in itself. For this reason, as there is no need in the other terminal devices apart from the specified terminal device to manage whether or not the turn has come to carry out the game input itself, a processing load is reduced.

In the heretofore described communication game system, the order determiner, in response to a progress condition of the game implemented by the game implementor, determines whether a turn has come to carry out the game input in its own terminal device.

In this case, although it is necessary to monitor whether or not the turn has come to carry out the game input itself in not only the specified terminal device but also in the other terminal devices, as there is no need to transmit and receive the order information, the communication load between the specified terminal device and each of the other terminal devices is lightened.

In the heretofore described communication game system, the substitute inputter, in accordance with an operation by the user of the specified terminal device, carries out as the substitute the game input in the cut off terminal device.

Also, it can be arranged that the substitute inputter includes a substitute input processor which, via an execution of a prescribed process executed independently of the operation by the user of the specified terminal device, carries out the substitute game input for the cut off terminal device.

In the former case, for example, even though it is a game of a nature whereby an unnaturalness is felt in the event that it is not based on an operation by a human, it is possible to naturally apply the invention. Meanwhile, in the latter case, for example, even though it is a game of a nature whereby the game can essentially not be established in the event that one human plays roles of a plurality of players, it is possible to apply the invention without problem.

In the heretofore described communication game system, it is acceptable that the specified terminal device further includes: a communication recovery determiner which determines, after it is determined by the communication condition determiner that there exists the cut off condition in the cut off terminal device, whether communication with the cut off terminal device has recovered; and a terminal recoveror which, when it is determined by the communication recovery determiner that the communication has recovered, and it is further determined by the communication condition determiner that the cut off condition does not exist, transmits game progress information indicating a progress condition of the game implemented by the game implementor to the cut off terminal device, wherein the cut off terminal device further includes: a game progress information receptor which receives the game progress information transmitted from the terminal recoveror; and a game restarter which, in accordance with the game progress information received by the game progress information receptor, causes the game implementor to restart the implementation of the game.

In this case, even in the event that the communication of the terminal device of a player who has participated in the game since a start is temporarily cut off, as the relevant player participates again in the game in the event that the communication recovers, it is possible to implement the game with, as far as possible, the same players. Also, it does not happen that the player who had been playing the game with the cut off condition terminal device, in which the communication has been cut off due to a temporary cause, is subsequently completely excluded from the game, nor does it happen that the other players are also made to wait for the implementation of the game until the communication of the cut off condition terminal device recovers.

In the heretofore described communication game system, it is also acceptable that the specified terminal device further includes: a new communication determiner which determines, after it is determined by the communication condition determiner that there exists the cut off condition, whether communication is possible with a new terminal device, which has not been in a condition to carry out the communication; and a terminal incorporator which, when it is determined by the new communication determiner that the communication has become possible with the new terminal device, and it is further determined by the communication condition determiner that the cut off condition does not exist, transmits the game progress information indicating the progress condition of the game implemented by the game implementor to the new terminal device, wherein the new terminal device includes: a game progress information receptor which receives the game progress information transmitted from the terminal incorporator; and a game starter which, in accordance with the game progress information received by the game progress information receptor, starts the implementation of the game implemented by the game implementor.

In this case, even in the event that the player who has participated in the game since the start becomes unable to participate due to the cutting off of the communication of the terminal device, in the event that the communication becomes possible with the other new terminal device, it becomes possible to stop substituting the game input with the specified terminal device, and implement the game in the same condition as at the start by adding the new terminal device with which the communication has become possible. Also, a configuration of this case, in the event that a terminal device other than the terminal devices used in the game since the start has been prepared, when a portion of the terminal devices used in the game falls into a condition in which the communication is impossible, it is possible to continue the game with the same player simply by changing the terminal device.

In a case in which the specified terminal device includes the communication recovery determiner or the terminal recoveror, or in a case in which it includes the new communication determiner or the terminal incorporator, it can be arranged that the substitute turn determiner determines, when it is determined that the cut off condition exists, whether a turn has come to carry out the game input in the cut off terminal device.

In the heretofore described communication game system, it can be arranged that the other terminal devices, apart from the specified terminal device, each include: a specified communication condition determiner which determines whether communication with the specified terminal device has been cut off; and a game completor which, in the event that it is determined by the specified communication condition determiner that the communication with the specified terminal device has been cut off, completes the implementation of the game implemented by the game implementor.

In this case, the terminal device which has a function of managing the communication with the other terminal devices need only be the one specified terminal device. That is, it is possible to make a configuration of the other terminal devices apart from the specified terminal device a simple one.

In the heretofore described communication game system, it is also acceptable that a prescribed terminal device, other than the other terminal devices, apart from the specified terminal device, includes: a specified communication condition determiner which determines whether communication with the specified terminal device has been cut off, and whether communication with the other terminal devices, apart from the specified terminal device, and the prescribed terminal device is continuing; and a new specified terminal device setter which, when it is determined by the specified communication condition determiner that communication with the specified terminal device has been cut off, and that communication with the other terminal devices is continuing, sets the prescribed terminal device to a new specified terminal device, wherein the new specified terminal device, with the terminal device which has been the specified terminal device as the cut off terminal device, carries out processes via the communication condition determiner, the substitute order determiner, the substitute inputter, and the substitute information transmitter.

In this case, even in the event that, although the communication is possible between the other terminal devices apart from the specified terminal device, the communication in only the specified terminal has been cut off, it is possible to smoothly continue the game with only the terminal devices apart from the original specified terminal device.

In order to achieve the heretofore described object, a game device according to a second aspect of the invention is a game device, which communicates with at least two other terminal devices, executes a game implemented between users of the at least two other terminal devices by the users alternately carrying out a prescribed game input for a game progression, the device comprising: an own order determiner which determines, in accordance with information received via a communication with remaining terminal devices of the at least two terminal devices, whether a turn has come to carry out a game input in its own terminal device; an inputter which carries out the game input, in accordance with an operation of the user, when it is determined by the order determiner that its own turn has come; a game information transmitter which transmits input information, including information relating to the game input transmitted from the inputter, to the other terminal devices; a game information receptor which receives other input information relating to another game that has been input into one of the other terminal devices, in an order in which the other users carry out the game input; a game implementor which implements the game in accordance with the game input, or the received other input information, every time the game input is carried out by the inputter, or every time the game information receptor receives the other input information; a communication condition determiner which determines whether there exists, among the at least two other terminal devices apart from the specified terminal device, a cut off terminal device, in which communication has been cut off from the other terminal devices; a substitute turn determiner which determines, when it is determined by the communication condition determiner that there exists the cut off condition in the cut off terminal device, whether it is a turn of the cut off terminal device to carry out a game input; a substitute inputter which, when it is determined by the substitute turn determiner that it is the turn of the cut off terminal device to carry out the game input, carries out a substitute game input for the cut off terminal device; and a substitute information transmitter which transmits substitute input information relating to the substitute game input carried out by the substitute inputter, as input information relating to the substitute game input in the cut off terminal device, to the other terminal devices, apart from the cut off terminal device, wherein the game implementor, when it is determined that there exists the cut off condition in the cut off terminal device, further implements the game in accordance with the substitute game input carried out by the substitute inputter.

In order to achieve the heretofore described object, a game implementation method according to a third aspect of the invention is a game implementation method for a system configured for at least three terminal devices, including communication devices, each of which carries out a transmission and a reception of information, where a user of each terminal device implements a game by alternately carrying out a prescribed game input for a game progression, the method comprising: saving received information in a memory furnished in each of the at least three terminal devices every time a communication device receives communication information transmitted from another terminal device; determining whether a turn has come to carry out a game input in its own terminal device in each of the at least three terminal devices, in accordance with the communication information saved in the memory unit furnished in each of the terminal devices; carrying out the game input in the terminal device which has determined that its own turn has come, in accordance with an operation by the user of the terminal device via an input device connected to the terminal device; saving game information in the terminal device which has determined that its own turn has come relating to the game input in the memory of the terminal device; transmitting from the terminal device in which the game input has been carried out, as the communication information, the game information relating to the game input in the terminal device to the other terminal devices which are carrying out the communication between each other; determining, in a specified terminal device of the at least three terminal devices, in accordance with the communication information saved in the memory of the specified terminal device, whether there exists, among the other terminal devices apart from the specified terminal device, a cut off terminal device, in which communication has been cut off from the other terminal devices; determining in the specified terminal device, when it is determined that there exists the cut off condition in the cut off terminal device, in accordance with the input information of the communication information saved in the memory of the specified terminal device, whether it is a turn of the cut off terminal device to carry out a game input; carrying out, in the specified terminal device, when it is determined that it is the turn of the cut off terminal device to carry out the game input, in accordance with the operation by the user of the specified terminal device via the input device connected to the specified terminal device, or in accordance with a result of a processing device of the specified terminal device executing a prescribed process, a substitute input as the game input for the cut off terminal device, and saving a substitute game information relating to the substitute input in the memory of the specified terminal device; transmitting substitute information relating to the substitute input saved in the memory from the communication device of the specified terminal device to the other terminal devices, apart from the cut off terminal device; and implementing, in each of the at least three terminal devices, the game in accordance with the information relating to the game input saved in the memory unit, or in accordance with the information relating to the substitute input. In order to achieve the heretofore described object, a program according to a fourth aspect of the invention is a computer readable medium including a program, which, when executed in a computer device, causes a communication of information to execute with at least two other computer devices, and executes a game where the users alternately carry out a prescribed game input for a game progression, the computer readable medium comprising: an order determination code section which, when executed, determines, in accordance with information received via a communication with the at least two other computer devices, whether a turn has come to carry out a game input in its own computer device; an input code section which, when executed, carries out the game input of its own turn, in accordance with an operation of the user, when it is determined by the order determination code section that its own turn has come; a game information transmission code section which, when executed, transmits input information relating to the game input transmitted from the input code section to other computer devices; a game information reception code section which, when executed, receives the input information, including information relating to another game input that has been input into one of the other computer devices, in an order in which other users carry out the game input; a game implementation code section which, when executed, implements the game in accordance with the game input, or the received other input information, every time the game input is carried out by the input code section, or every time the game information reception code section receives the input information; a communication condition determination code section which, when executed, determines whether there exists, among the at least two other computer devices apart from the specified computer device, a cut off computer device, in which communication has been cut off from the other computer devices; a substitute turn determination code section which, when executed, determines, when it is determined by the communication condition determination code section that there exists the cut off condition device, whether or not it is the turn of the relevant cut off condition in the cut off computer device to carry out a game input; a substitute input code section which, when executed, and when it is determined by the substitute turn determination code section that it is the turn of the cut off computer device to carry out a game input, carries out a substitute game input for the cut off computer device; a substitute information transmission code section which, when executed, transmits substitute input information relating to the substitute game input carried out by the substitute input code section, as input information relating to the substitute game input in the cut off computer device, to the other computer devices, apart from the cut off computer device; and a game implementation code section which, when executed, implements the game in accordance with the game input, or the received other input information, every time the game input is carried out by the input code section or the substitute inputter, or every time the game information reception code section receives the other input information.

In order to achieve the heretofore described object, a computer readable recording medium recording a program, executed in a computer device carrying out a communication of information with at least two other computer devices, for executing a game implemented between users of relevant at least two other computer devices by the users alternately carrying out a prescribed game input for a game progression, the program causing the computer device to function as: an order determiner which determines, in accordance with information received via a communication with the at least two other computer devices, whether a turn has come to carry out a game input in its own computer device; an inputter which carries out the game input, in accordance with an operation of the user, when it is determined by the order determiner that its own turn has come; a game information transmitter which transmits input information, including information relating to the game input transmitted from the inputter to the other computer devices; a game information receptor which receives other input information relating to another game input that has been input into one of the other computer devices, in an order in which the other users carry out the game input; a game implementor which implements the game in accordance with the game input, or the received other input information, every time the game input is carried out by the inputter, or every time the game information receptor receives the other input information; a communication condition determiner which determines whether there exists, among the at least two other computer devices apart from the specified computer device, a cut off computer device, in which communication has been cut off from the other computer devices; a substitute turn determiner which determines, when it is determined by the communication condition determiner that there exists the cut off condition in the cut off computer device, whether it is a turn of the cut off computer device to carry out a game input; a substitute inputter which, when it is determined by the substitute turn determiner that it is the turn of the cut off computer device to carry out the game input, carries out a substitute game input for the cut off computer device; a substitute information transmitter which transmits substitute input information relating to the substitute game input carried out by the substitute inputter, as input information relating to the substitute game input in the cut off computer device, to the other computer devices, apart from the cut off computer device; and a game implementor which implements the game in accordance with the game input, or the received other input information, every time the game input is carried out by the inputter or the substitute inputter, or every time the game information receptor receives the other input information.

DESCRIPTION OF THE PREFERRED EMBODIMENTS

Hereafter, a description will be given of an embodiment of the invention, with reference to the attached drawings.

Figure 1:
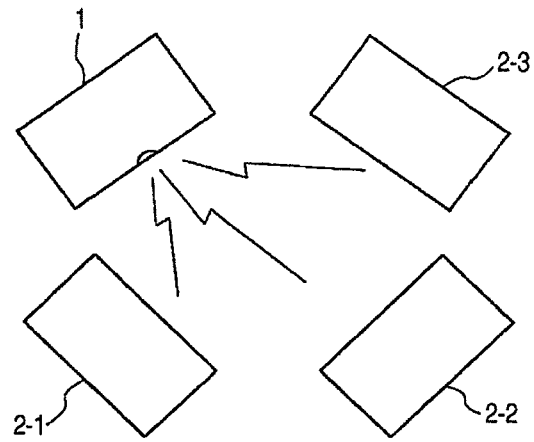
FIG. 1 shows a configuration of a communication game system according to an embodiment of the invention.

FIG. 1 shows a configuration of a communication game system according to the embodiment. A game executed in the communication game system being a game played by four players, one player is a host of the game, while the other three players are participants in the game. As shown in the figure, the communication game system is configured of a game machine 1 of the player who is the host (hereafter called a host game machine) and game machines 2 (2-1 to 2-3) of each player who is a participant (hereafter called participant machines). The host game machine 1 and the participant game machines 2, being game machines of a same configuration, transmit and receive information between each other via a wireless communication.

Figure 2:
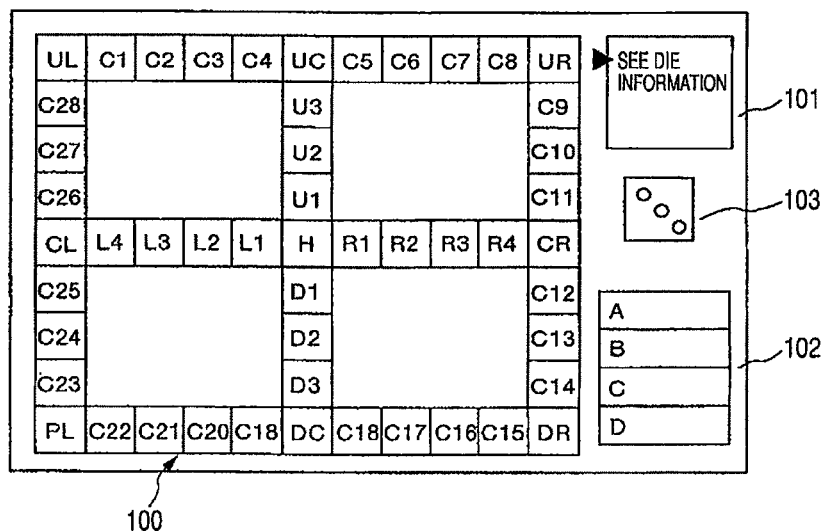
FIG. 2 shows an example of a screen of a game executed in the communication game system of FIG. 1.

FIG. 2 shows an example of a screen of the game executed in the communication game system of FIG. 1. The game executed in the communication game system being a board game, a game board 100, a player instruction information display frame 101, an individual player score display frame 102, and a die 103 are displayed on the game screen. In the event that a player selects an item "see information" from the player instruction information display frame 101, detailed information (not shown) relating to a progress condition of the game is displayed on a front surface side of the game board 100 on the game screen.

The player who is the host, and each of the players who becomes a participant in response to an invitation from the host, implement the game by moving their own player character from a square (an H square) in a centre of the game board 100. When a game is started, an order in which the four players implement the game is determined. From a start to a finish of one play in order of one player is referred to as one turn. In one turn, the player character of each player, in accordance with an instruction of the player, proceeds a number of spaces on the game board 100 corresponding to a number on the die 103.

A progress direction of the player character depends on a restriction from a previous turn. In the H square on the game board 100, a UC square, a CR square, a DC square and a CL square, which are at an extreme top, right, bottom and left respectively from the H square, the player can select the progress direction of the player character. For example, in the event that the player character of a certain player proceeds from the H square to an R3 square on the previous turn, and that the number on the die 103 on a present turn is four, after moving from the R3 square to the CR square because of the restriction deriving from the progress direction of the previous turn, it is possible to proceed to a C11 square or a C12 square in accordance with a selection of the player. It is possible to stop the player character one square farther ahead, on a C10 square or a C13 square.

When the player character stops on any square on the game board 100, a play result of the relevant turn is displayed in accordance with a process allotted to the square on which it has stopped. Depending on the play result of the turn, a score is given to the player who made the turn, or a score is increased or decreased among the players. The score of each player which changes in this way is displayed in the individual player score display frame 102. Also, in order to shake the die 103, determine the square on which the player character stops, and carry out the process allotted to the square on which the player character has stopped, some players need to select an instruction item displayed in the player instruction information display frame 101.

When the die 103 has been shaken and the number on the die has been determined, the game machine 1 or 2 of the player to whom the turn is allotted transmits game progress information indicating the number on the die to the other game machines 1 and/or 2. Every time the player character moves one square on the game board 100, game progress information indicating the square to which it has moved is transmitted to the other game machines 1 and/or 2. When the square on which the player character stops has been determined, and the process on the relevant square has been completed, turn determination information indicating a process result is transmitted to the other game machines 1 and/or 2. It is possible for the game machines 1 and/or 2 of the players to whom the turn is not allotted to implement the game, in accordance with the game progress information or the turn determination information, in the same way as the game machine 1 or 2 of the player to whom the turn is allotted.

Also, although, at an end of one turn, the turn determination information is transmitted from the game machine 1 or 2 of the player of the relevant turn to the game machines 1 and/or 2 of the other players, the host game machine 1, after transmitting the turn determination information itself, or after receiving the turn determination information from one of the participant game machines 2, transmits turn completion information (including information which specifies a player who is to execute a next turn) to each participant game machine 2. Each participant game machine 2, in response to receiving the turn completion information, transmits turn confirmation information to the host game machine 1. The turn of the game moves to a player specified in the turn completion information. In the event that the score acquired by one of the players reaches a prescribed number of points, the game is complete.

As the host game machine 1 and the participant game machines 2-1 to 2-3 transmit and receive the information between each other via the wireless communication, and are each individually battery driven, it is conceivable that a cutting off of communication between some of the game machines 1 and 2-1 to 2-3 and the other game machines will occur before the game is completed. A detailed description of a handling in this kind of case will be given hereafter.

Next, a description will be given of the game machines 1 and 2 applied in the communication game system according to the embodiment.

Figure 3A:
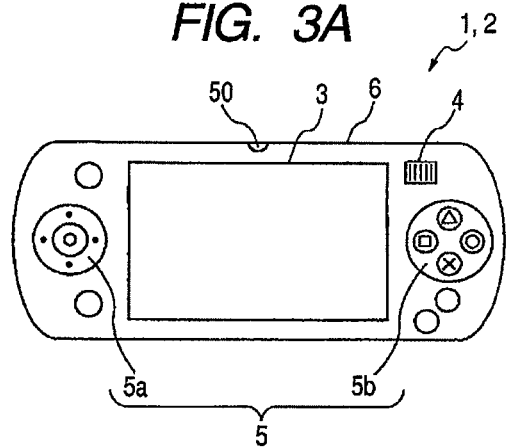
FIG. 3A being an external view of a game machine applied to the communication game system of FIG. 1.

FIG. 3A shows an external view of the game machines 1 and 2 applied in the communication game system of FIG. 1. As shown in the figure, the game machines 1 and 2 are configured to include, on a main body 6, an operation input unit 5 having a direction key 5a and an operation key 5b and the like, on which an input operation by the player is carried out, a monitor 3 which displays an image, and a speaker 4 which emits a sound. A recording medium on which a game program is recorded being inserted in the main body 6, the game program is executed by a CPU built into the main body 6. An external memory device such as a memory stick is inserted into the main body 6, and a saving of game data, a reading of the saved data and the like are executed by the CPU.

The game machines 1 and 2 also include a wireless interface device 50. The wireless interface device 50, using, for example, IEEE802.11 as a wireless LAN standard, establishes a wireless ad hoc network with the other game machines. The game machines 1 and 2, by establishing the ad hoc network, can realize the communication with the other game machines 1 and/or 2, with no need of a separate infrastructure such as a base station or an access point.

Figure 3B:
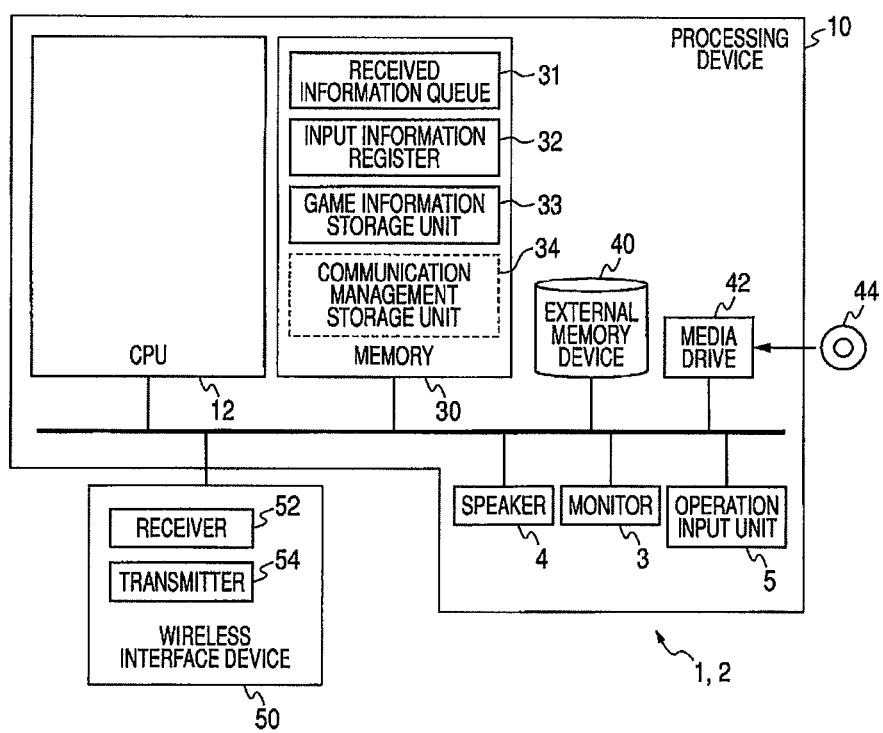
FIG. 3B is a functional block diagram of the game machine.

FIG. 3B is a block diagram showing a functional configuration of the game machines 1 and 2 applied in the communication game system of FIG. 1. As shown in the figure, the game machines 1 and 2 include a processing device 10, which carries out mainly operations relating to an application process, and a wireless interface device 50, which carries out operations relating to the communication. The processing device 10 and the wireless interface device 50 being provided as discrete hardware, the processing device 10 and the wireless interface device 50 are electrically connected by a bus. The processing device 10, being configured as a host personal computer, also has a function of controlling the operations of the wireless interface device 50. The wireless interface device 50 has its own CPU.

The processing device 10 includes a CPU 12, a memory 30, an external memory device 40, a media drive 42, the operation input unit 5, the monitor 3 and the speaker 4. The CPU 12 executes a program realizing a process stored in the memory 30, shown in a flowchart to be described hereafter. Although the programs executed by the CPU 12 in the host game machine 1 and the participant game machines 2 are different, a program of a turn execution process for the relevant player to implement the game by one turn's worth is common to the host game machine 1 and the participant game machines 2. The CPU 12 includes an internal timer.

The memory 30 includes a received information queue 31, which stores the information (the game progress information, the turn determination information, the turn completion information (and the turn completion information)) received from the other game machines 1 or 2 on a first-in, first-out basis, an input information register 32, which stores information relating to operations input from the operation input unit 5, and a game information storage unit 33, which stores the information relating to the progress condition of the game. The memory 30 of the host game machine 1 further includes a communication management storage unit 34 for managing a communication condition with the participant game machines 2-1 to 2-3.

Of the information stored in the game information storage unit 33, information indicating a square on which one's own and each other player's player character is positioned includes information indicating a square on which the player character is presently temporarily positioned and a square on which it has been positioned immediately before, and information indicating a square on which it has been positioned when the turn has been determined. Furthermore, information indicating the progress direction in which the player character has proceeded to the square on which it has been positioned when the turn has been determined being included, it is possible to judge the progress direction of the player character on the previous turn.

The memory 30, apart from these storage areas, includes a storage area of the program executed by the CPU 12, and an operation area which temporarily stores data generated when the CPU 12 executes the program. The program for executing the game according to the embodiment being stored in the recording medium 44 and distributed, necessary program modules are loaded segmented from the recording medium 44 into the storage area of the program by the media drive 42, under a control of the CPU 12, in accordance with the progress condition of the game.

The operation input unit 5 includes the direction key 5a and the operation key 5b, which receive an operating instruction from the player. The monitor 3, being configured of, for example, a liquid crystal panel, displays the image, and the speaker 4 emits the sound. The external memory device 40, being configured as a storage device such as the memory stick, is used for the saving or a loading of the game data, and the like. The disc-shaped recording medium 44 being inserted in the media drive 42, the program, data and the like recorded in the recording medium 44 are read out. The read out program and data, being stored in the memory 30, are used in the processes in the CPU 12.

The wireless interface device 50 includes a receiver 52, which receives the information transmitted from the other game machines 1 and/or 2, and a transmitter 54, which transmits the information to the other game machines 1 and/or 2. The information received by the receiver 52 is stored, in an order in which it is received, in the received information queue 31 of the memory 30, by a control of the CPU included in the wireless interface device 50. Also, the CPU 12 of the processing device 10 transfers information which needs to be transmitted to the other game machines 1 and/or 2 to the wireless interface device 50, while the transmitter 54 transmits the information transferred from the CPU 12 to the other game machines 1 and/or 2, by a control of the CPU included in the wireless interface device 50.

The information transmitted and received between the game machines 1 and 2 includes source information indicating the game machine 1 or 2 which is a source, and destination information indicating the game machine 1 or 2 which is a destination. The destination information, with regard to the information transmitted from one of the game machines 1 or 2 to the other plurality of game machines 1 or 2, includes information indicating each of the other plurality of game machines 1 or 2. The source information and the destination information can specify the game machines 1 or 2 which are the source and the destination by a game machine-specific individual identification number.

Also, the game progress information and the turn determination information include player information specified by an order in which the players play the game, a player character name and the like, separately from the source information. A reason that this kind of player information is necessary is that, as will be described next, when the cutting off of communication of one of the participant game machines 2-1 to 2-3 occurs, a turn of the player of the participant game machine 2 of which the communication has been cut off may be carried out in the host game machine 1 instead.

Next, a description will be given of a case in which the communication between the host game machine 1, or one of the participant game machines 2-1 to 2-3, and the other game machines 1 or 2 is cut off. It does not happen that the information transmitted from the game machine 1 or 2 is received by the other game machine 1 or 2 of which the communication has been cut off. Neither does it happen that the game machine 1 or 2 receives the information transmitted from the other game machine 1 or 2 of which the communication has been cut off. Herein, the description will be given presupposing that the communication between the game machines 1 and 2 is not cut off partway through the turn and that, in a turn in which the game progress information has been received, it is always possible to receive the turn determination information.

In the embodiment, the host game machine 1 constantly monitors whether the communication with each of the participant game machines 2-1 to 2-3 is possible. Specifically, after sending the turn determination information, which constitutes an end of one turn, itself, or after receiving the turn determination information from one of the participant game machines 2, it transmits the turn completion information to the participant game machines 2 which are in a connected condition. The participant game machines 2 which receive the turn completion information return the turn confirmation information, in response to the reception of the relevant turn completion information, to the host game machine 1.

The host machine 1, after transmitting the turn completion information, monitors a reception of the turn confirmation information from each of the participant game machines 2, recognizes a participant game machine 2 from which the turn confirmation information has not been returned, even though a prescribed time has elapsed after transmitting the turn completion information, as being in a condition in which the communication has been cut off, and stores information on the matter in the communication management storage unit 34. In the event that the information indicating the participant game machine 2 which is in the condition in which the communication has been cut off is stored in the communication management storage unit 34, the host machine 1 judges not only whether or not its own turn has come, but also whether a turn has come of a player of the participant game machine 2 which is in the condition in which the communication has been cut off.

In the event that the turn has come of the player of the participant game machine 2 which is in the condition in which the communication has been cut off, the host machine 1 executes the turn of the player instead. Naturally, a progression of the game on the turn is not decided by the player who is the host, but rather the progression of the game on the turn substituted for is decided by an execution of a prescribed thinking routine. In the event that the turn of the player of the participant game machine 2 which is in the condition of being cut off is executed by the substitute, the game progress information, including player information on the player whose turn has been executed by the substitute, and the turn determination information are sent sequentially from the host game machine 1 to the participant game machines 2 which are in a connected condition.

Meanwhile, unlike the host game machine 1, the participant game machines 2 do not have a function which monitors whether or not the communication with the game machines 1 and 2 of the other players has been cut off. When the participant game machine 2 transmits the turn determination information on its own turn, or when it receives the turn determination information from the other game machines 1 or 2, in the event that the host game machine 1 is in the connected condition, the turn completion information responding to the turn determination information should be sent from the host game machine 1. However, when the turn completion information is not received even though a prescribed time has elapsed from the transmission or reception of the turn determination information, it is judged that the communication with the host game machine 1 has been cut off, and the game is caused to be finished.

Hereafter, a description will be given of processes executed in each of the game machines 1 and 2 in the communication game system according to the embodiment. In the communication game system, the processes executed in the game machine 1 of the player who is the host differ from the processes executed in the game machines of the players who are the participants. Naturally, as they are implementing the same game, there are also many processes which are common to both.

When beginning the game, the player who is the host gathers the other three players who will be the participants. When the host game machine 1 can synchronize with the other three participant game machines 2 which participate in the game, the participants in the game are thereby determined. When the participants in the game have been determined, each player selects the player character to use for him or herself to play the game. The participant game machines 2 transmit information indicating the selected player characters to the host game machine 1.

Next, the CPU 12 of the host game machine 1 and the participant game machines 2, executing a random function, acquires any number which is in a prescribed range. The numbers acquired in the participant game machines 2 are each sent to the host game machine 1. In the host game machine 1, the numbers acquired in each of the game machines 1 and 2 are compared, and an order in which the players play one turn of the game is decided. The host game machine 1, as well as storing information indicating the decided order in the game information storage unit 33, transmits information indicating the relevant order, and the player characters chosen by the players who will be the participants, to the participant game machines 2.

The participant game machines 2, in accordance with the information received from the host game machine 1, store the order in which the players play one turn of the game, and the player characters of the other players, in the game information storage unit 33. In the information indicating the progress condition of the game stored in the game information storage unit 33 at this point, the player character of each player is positioned in the H square in the centre of the game board 100, while the score acquired by each player is at a predetermined value.

Hereafter, a description will be given of a process executed after the order when the host and the three participants play the game has been determined in this way, divided into a process executed in the game machine 1 of the player who is the host, and a process executed in the game machines 2 of the players who are the participants. Although, in the game machines 1 and 2, a process is carried out which causes a screen corresponding to the information indicating the progress condition of the game stored in the game information storage unit 33 to be displayed on the monitor 3, and transmits the sound from the speaker 4 as necessary, as there is no difference regarding this kind of process with a heretofore known game, a detailed description will be omitted.

Figure 4:
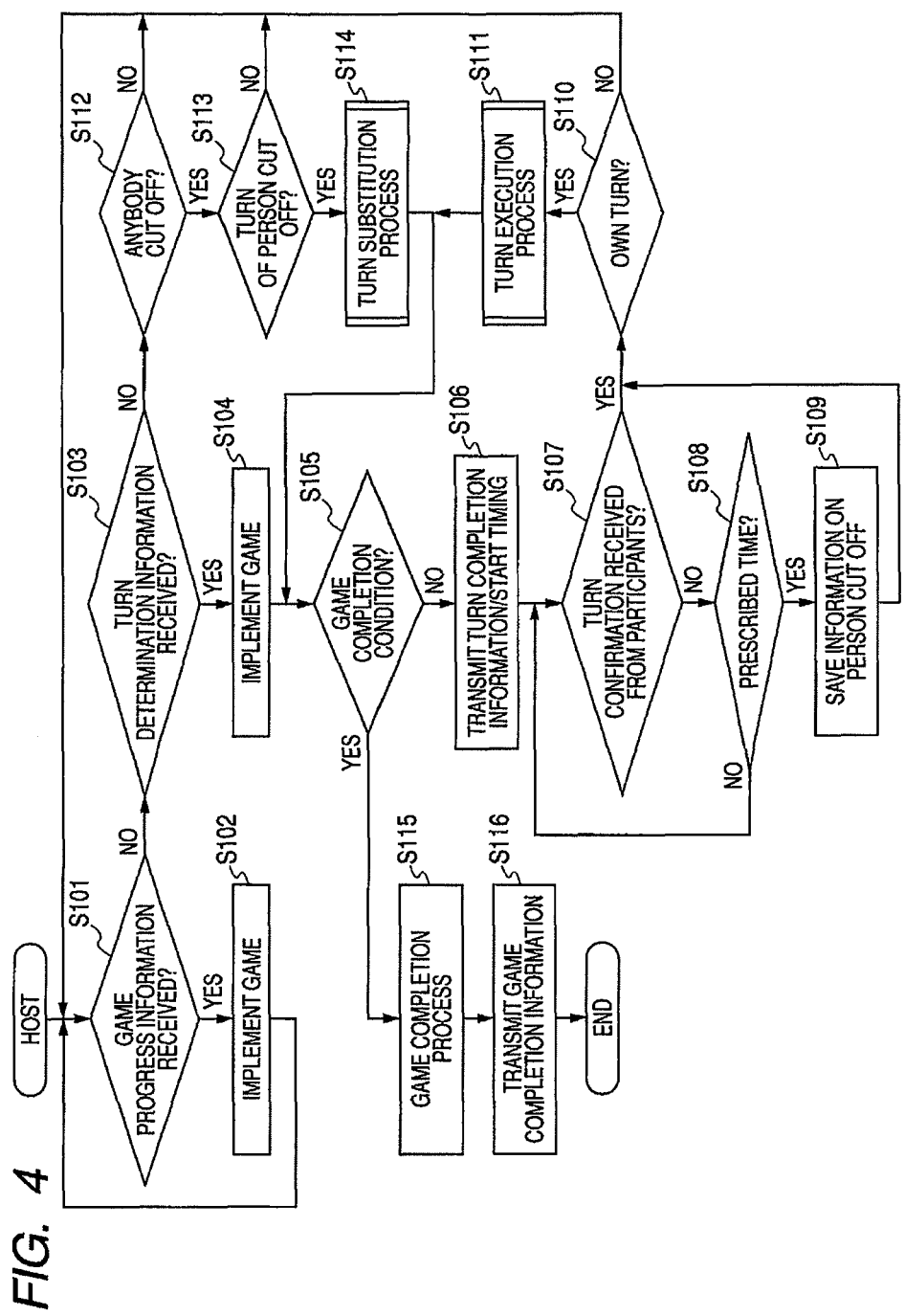
FIG. 4 is a flowchart showing a process executed in a game machine of a host of the game.

FIG. 4 is a flowchart showing the process executed in the host game machine 1. In the host game machine 1, the CPU 12, on receiving the game progress information from one of the participant game machines 2-1 to 2-3 via the receiver 52 of the wireless interface device 50, determines whether or not it is stored at a head of the received information queue 31 (step S101).

If the game progress information is stored at the head of the received information queue 31, the CPU 12 removes the relevant game progress information from the received information queue 31 and, in accordance with the removed game progress information, updates the information stored in the game information storage unit 33. For example, in the event that the game progress information indicates the number on the die, the number on the die 103 on the game screen is taken to be the number indicated by the game progress information. Also, in the event that the game progress information indicates the square to which the player character has moved, the CPU 12 updates the square on the game board 100 on which the relevant player character is positioned (step S102). Then, it returns to the process of step S101.

If the game progress information is not stored at the head of the received information queue 31 in step S101, the CPU 12, on receiving the turn determination information from one of the participant game machines 2-1 to 2-3 via the receiver 52 of the wireless interface device 50, determines whether or not it is stored at the head of the received information queue 31 (step S103).

If the turn determination information is stored at the head of the received information queue 31, the CPU 12 removes the relevant turn determination information from the received information queue 31 and, in accordance with the removed turn determination information, updates the information stored in the game information storage unit 33. Herein, in accordance with the turn determination information, the score of each player is increased or reduced, and the square and progress direction at a turn completion time are stored (step S104). Subsequently, the CPU 12 proceeds to step S105. It also proceeds to step S105 in the event that a turn execution process of step S111, to be described hereafter, or a turn substitution process of step S114, to be described hereafter, is finished.

In step S105, when the score of each player is increased or reduced in accordance with the turn determination information, the CPU 12 determines whether or not the score of any of the players fulfills a condition for a game completion. If none of the players' scores fulfills the condition for the game completion, the CPU 12 transfers the turn completion information indicating a player who has a next turn to the wireless interface device 50, and causes it to be transmitted from the transmitter 54 to the participant game machines 2 which are in the connected condition. The CPU 12 also starts a timing based on an internal timer from zero (step S106).

Next, the CPU 12 removes the turn confirmation information sent from each of the participant game machines 2 if it is stored in the received information queue 31, and determines whether or not the turn confirmation information has been received, in response to the turn completion information transmitted in step S106, from all of the participant game machines 2 in which the communication is in the connected condition (step S107). If there is any participant game machine 2 in the connected condition from which the turn confirmation information has not yet been received, the CPU 12 determines whether or not a prescribed time has elapsed since the timing starting of step S106 (step S108). If the prescribed time has not elapsed, the CPU 12 returns to the process of step S107.

If the prescribed time has elapsed, the CPU 12 recognizes the participant game machine 2 from which the turn confirmation information has not been received as being the game machine in which the communication is in the cut off condition, and stores the information indicating the matter in the communication management storage unit 34 (step S109). Then, the CPU 12 proceeds to a process of step S110. Also, if the turn confirmation information is received from all of the participant game machines 2 in the connected condition in step S107, the CPU 12 proceeds to the process of step S110.

In step S110, the CPU 12, referring to the progress condition of the game stored in the game information storage unit 33, determines whether or not the order is such that its own turn comes next. If the order is such that its own turn does not come next, the CPU 12 returns to the process of step S101. If the order is such that its own turn comes next, the CPU 12 carries out the turn execution process, details of which will be described hereafter, causing the player who is the host to implement one turn of the game (step S111). When the turn execution process is finished, the CPU 12 proceeds to the process of step S105.

If the turn determination information is not stored at the head of the received information queue 31 in step S103, the CPU 12, referring to the communication management storage unit 34, determines whether or not there is a participant game machine 2 which is in the cut off condition (step S112). If there is a participant game machine 2 which is in the cut off condition, the CPU 12, referring to the progress condition of the game stored in the game information storage unit 33, determines whether or not the order is such that a turn of a player of the participant game machine 2 which is in the cut off condition comes next (step S113).

If the order is such that the turn of the player of the participant game machine 2 which is in the cut off condition comes next, the CPU 12 carries out the turn substitution process, details of which will be described hereafter, implementing one turn of the game of the player of the participant game machine 2 which is in the cut off condition instead of the relevant player (step S114). When the turn substitution process is finished, the CPU 12 proceeds to the process of step S105. If, in step S112, there is no participant game machine 2 which is in the cut off condition, or if, in step S113, the order is not such that the turn of the player of the participant game machine 2 which is in the cut off condition comes next, the CPU 12 returns directly to step S101.

If, in step S105, the score of any of the players fulfills the condition for the game completion, the CPU 12, carrying out a prescribed game completion process, causes the game to be completed (step S115). Also, the CPU 12 transfers the game completion information to the wireless interface device 50, causing it to be transmitted from the transmitter 54 to the participant game machines 2 which are in the connected condition (step S117). Then, the processes executed in the host game machine 1 for the present game are completed.

Figure 5:
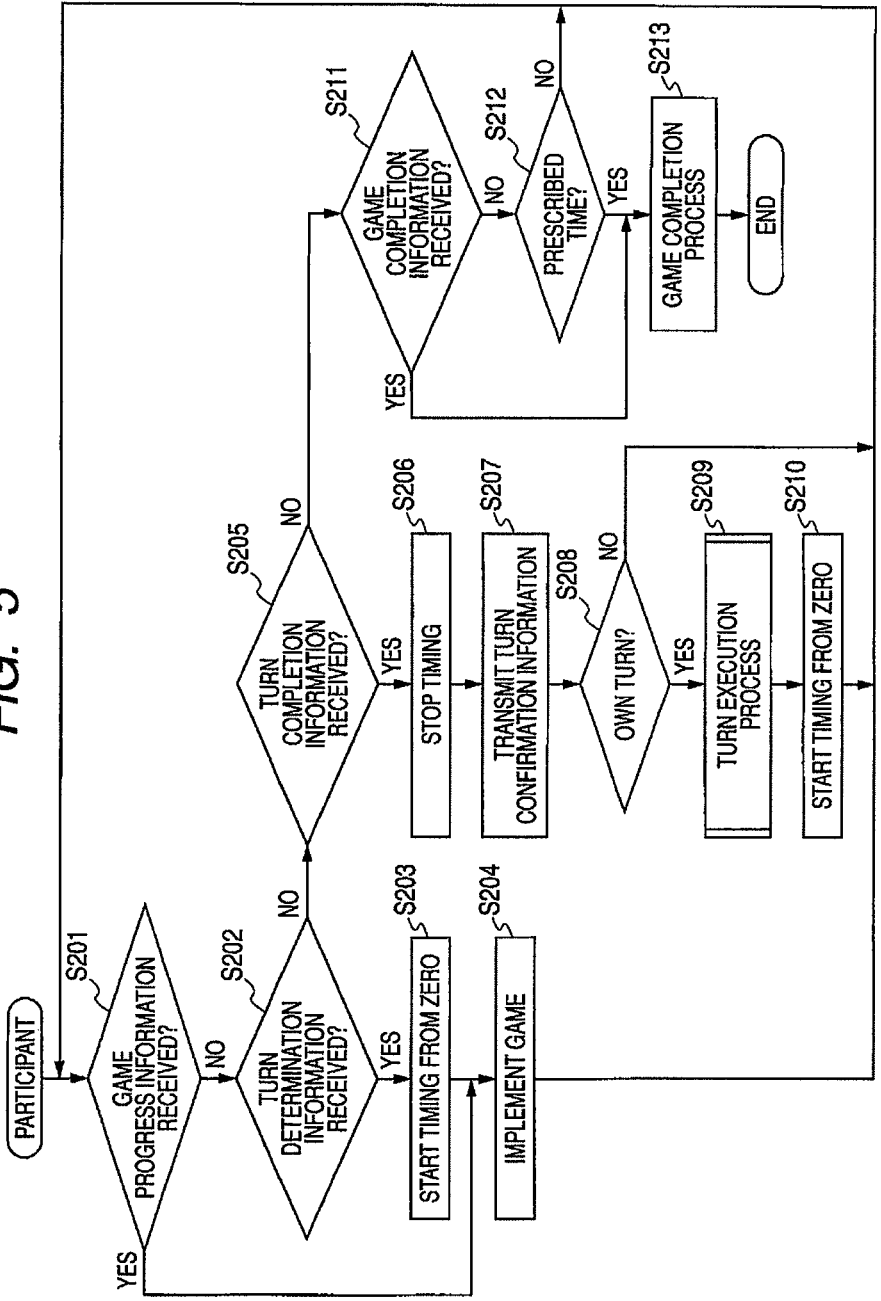
FIG. 5 is a flowchart showing a process executed in a game device of a participant in the game.

FIG. 5 is a flowchart showing the process executed in the participant game machines 2. In the participant game machines 2, the CPU 12, on receiving the game progress information from one of the other game machines 1 or 2 via the receiver 52 of the wireless interface device 50, determines whether or not it is stored at the head of the received information queue 31 (step S201) If the game progress information is stored at the head of the received information queue 31, the CPU 12 proceeds to a process of step S204.

If the game progress information is not stored at the head of the received information queue 31, the CPU 12, on receiving the turn determination information from one of the other game machines 1 or 2 via the receiver 52 of the wireless interface device 50, determines whether or not it is stored at the head of the received information queue 31 (step S202).

If the turn determination information is stored at the head of the received information queue 31, as long as the communication link with the host game machine 1 is normal, the turn completion information should be sent next from the host game machine 1 which received the relevant turn determination information. The CPU 12, at this point, starts the timing based on the internal timer from zero (step S203). Then, the CPU 12 proceeds to a process of step S204.

In step S204, the CPU 12 removes the game progress information or the turn determination information from the received information queue 31 and, in accordance with the removed game progress information, updates the information stored in the game information storage unit 33. For example, in the event that the game progress information indicates the number on the die, the number on the die 103 on the game screen is taken to be the number indicated by the game progress information. Also, in the event that the game progress information indicates the square to which the player character has moved, the CPU 12 updates the square on the game board 100 on which the relevant player character is positioned. Alternatively, in accordance with the turn determination information, it increases or reduces the score of each player. Then, it returns to the process of step S201.

If, in step S202, the turn determination information is not stored at the head of the received information queue 31, the CPU 12, on receiving the turn completion information from the host game machine 1 via the receiver 52 of the wireless interface device 50, determines whether or not it is stored at the head of the received information queue 31 (step S205). If the turn completion information is stored at the head of the received information queue 31, the CPU 12, as well as removing the relevant turn completion information from the received information queue 31, stops the timing based on the internal timer at this point (step S206). Furthermore, the CPU 12 transfers the turn confirmation information to the wireless interface device 50, causing it to be transmitted from the transmitter 54 to the host game machine 1 (step S207).

Next, the CPU 12, referring to the removed turn completion information, determines whether or not the order is such that its own turn comes next. If the order is such that its own turn does not come next, the CPU 12 returns directly to the process of step S201. If the order is such that its own turn comes next, the CPU 12 carries out the turn execution process, the details of which will be described hereafter, causing the player who is the host to implement one turn of the game (step S209).

When the turn execution process is finished, as long as the communication link with the host game machine 1 is normal, the turn completion information should be sent next from the host game machine 1, in response to the turn determination information transmitted in the relevant turn execution process. The CPU 12, at this point, starts the timing based on the internal timer from zero (step S210). Then, the CPU 12 proceeds to the process of step S201.

If, in step S205, the turn completion information is not stored at the head of the received information queue 31, the CPU 12, on receiving the game completion information from the host game machine 1 via the receiver 52 of the wireless interface device 50, determines whether or not it is stored at the head of the received information queue 31 (step S211). If the game completion information is not stored at the head of the received information queue 31, the CPU 12 determines whether or not a prescribed time has elapsed since the timing starting of step S203 or step S210 (step S212). If the prescribed time has not elapsed, the CPU 12 returns to the process of step S201.

If, in step S211, the game completion information has been stored at the head of the received information queue 31, or if, in step S212, the prescribed time has elapsed since the timing starting, the CPU 12, carrying out the prescribed game completion process, causes the game to be completed (step S213). Then, the processes executed in the participant game machines 2 for the present game are completed.

Figure 6:
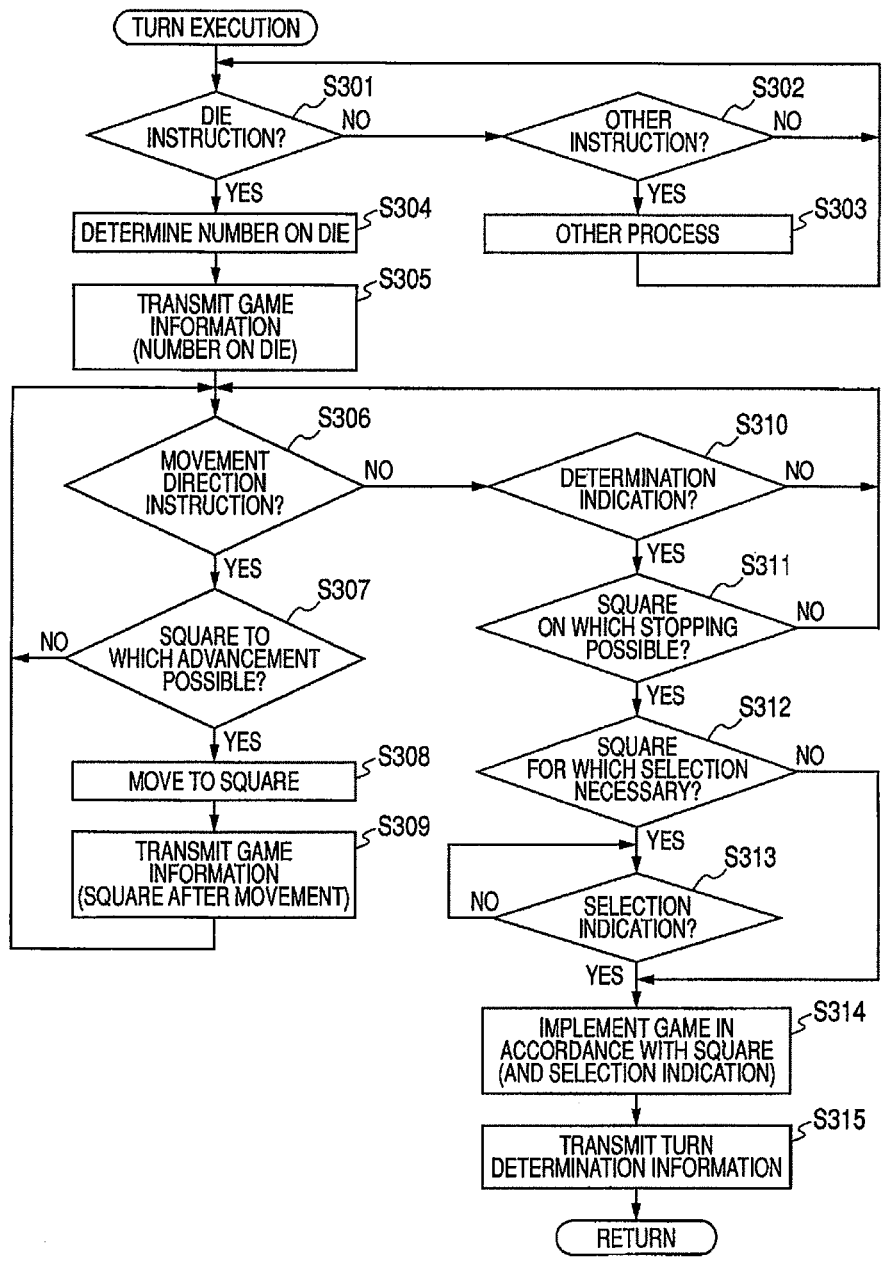
FIG. 6 is a flowchart showing in detail a turn execution process of FIG. 4 and FIG. 5.

FIG. 6 is a flowchart showing in detail the turn execution process executed in step S111 of FIG. 4 and step S209 of FIG. 5. In the turn execution process, the CPU 12, in accordance with the display in the player instruction information display frame 101 and the input from the operation input unit 5, determines whether or not the shaking of the die 103 has been instructed by the player (step S301). If the shaking of the die 103 has not been instructed, the CPU 12, in accordance with the display in the player instruction information display frame 101 and the input from the operation input unit 5, determines whether or not anything other than the shaking of the die 103 has been instructed (step S302).

If nothing other than the shaking of the die 103 has been instructed either, the CPU 12 returns directly to the process of step S301, and waits until something is instructed by the player. If something other than the shaking of the die 103 has been instructed, the CPU 12 carries out a process appropriate to the instruction. As the process has no connection with the invention, a detailed description will be omitted (step S303). Then, the CPU returns to the process of step S301.

If the shaking of the die 103 has been instructed in step S301, the CPU 12, executing the random function, determines the number on the die 103 in a range of one to six (step S304). The determined number, as well as being temporarily stored in the game information storage unit 33, is also displayed on the game screen. The CPU 12 transfers the game progress information which, as well as including the relevant player as the player information, indicates the determined number on the die, to the wireless interface device 50, causing it to be transmitted from the transmitter 54 to the other game machines 1 and/or 2 (step S305). Then, the CPU 12 proceeds to a process of step S306.

In step S306, the CPU 12, in accordance with an operation by the player of the operation input unit 5 (particularly the direction key 5a), determines whether or not an instruction has been input for moving the player character from the square on the game board 100 on which it is presently positioned to an adjacent square. If the instruction for moving to an adjacent square has been input, the CPU 12, based on the number on the die 103 and the progress direction on the previous turn, determines whether or not the square to which the movement has just been instructed is a square to which it is possible for the player character to move (step S307). If it is not a square to which it is possible for the player character to move, the CPU 12 returns directly to the process of step 306.

If it is a square to which it is possible for the player character to move, the CPU 12 updates the square on the game board 100 on which the player character is positioned to the square which has just been instructed, and stores it in the game information storage unit 33 (step S308). The CPU 12 transfers the game progress information which, as well as including the relevant player as the player information, indicates the square to which the player character has moved, to the wireless interface device 50, causing it to be transmitted from the transmitter 54 to the other game machines 1 and/or 2 (step S309). Then, the CPU 12 returns to the process of step S306.

If, in step 306, the movement of the square on which the player character is positioned has not been instructed, the CPU 12, in accordance with an operation by the player of the operation input unit 5 (particularly the operation key 5b), determines whether or not an instruction has been input for determining the present square as the square on which the player character stops on the present turn (step S310). If the instruction for determining the square on which the player character stops has not been input, the CPU 12 returns directly to the process of step S306.

If the instruction for determining the square on which the player character stops has been input, the CPU 12, based on the number on the die 103 on the present turn, determines whether or not the square on which the player character is positioned is a square on which it is possible to stop it on the present turn (step S311). If it is not a square on which it is possible to stop it on the present turn, the CPU 12 returns directly to the process of step S306.

If it is a square on which it is possible to stop the player character on the present turn, the CPU 12 determines the square on which the player character is presently positioned as the square on which it stops on the present turn. The CPU 12 determines whether or not the determined square is a square which needs a further instruction from the player in order to carry out a process allotted thereto (step S312). If it is not a square which needs the instruction from the player, the CPU 12 proceeds directly to a process of step S314.

If it is a square which needs the instruction from the player, the CPU 12, in accordance with the display in the player instruction information display frame 101 and the input from the operation input unit 5, determines whether or not an instruction item of the process allotted to the relevant square has been selected by the player (step S313). Until the instruction item of the process allotted to the relevant square has been selected, the CPU 12 waits for the instruction to be selected, repeatedly carrying out the process of step S313. When the instruction item of the process allotted to the relevant square is selected, the CPU 12 proceeds to a process of step S314.

In step S314, the CPU 12 carries out a prescribed calculation in response to the process allotted to the square (the instruction item further selected in the event that the selection of the instruction item is necessary) and, as well as increasing or reducing the score of each player in accordance with a calculation result, stores the square and the progress direction of the player character determined by the designation in the game information storage unit 33. The CPU 12, furthermore, transfers the turn determination information which, as well as including the relevant player as the player information, indicates an increase or reduction value of the score of each player, to the wireless interface device 50, causing it to be transmitted from the transmitter 54 to the other game machines 1 and/or 2 (step S315). Then, the CPU 12 completes the turn execution process, and returns to the process of the flowchart of FIG. 4 or FIG. 5.

Figure 7:
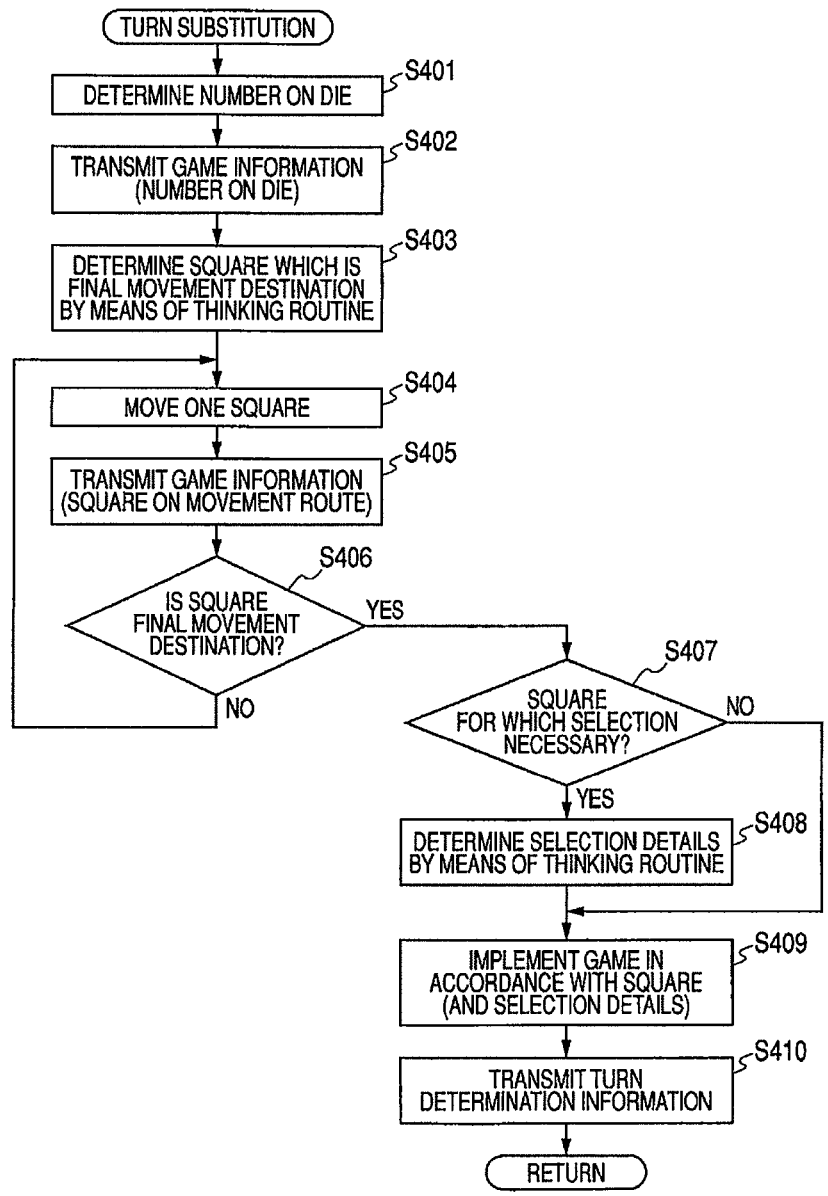
FIG. 7 is a flowchart showing in detail a turn substitution process of FIG. 4.

FIG. 7 is a flowchart showing in detail the turn substitution process executed in step S114 of FIG. 4. In the turn substitution process, the CPU 12, executing the random function, determines the number on the die 103 in the range of one to six (step S401). The CPU 12 transfers the game progress information which, as well as including the player whose turn is substituted as the player information, indicates the determined number on the die, to the wireless interface device 50, causing it to be transmitted from the transmitter 54 to the participant game machines 2 which are in the connected condition (step S402).

Next, the CPU 12, executing the prescribed thinking routine, in accordance with the number on the die, and with the square on which the player character of the player whose turn is substituted is positioned, and the progress direction, at a determination time of the previous turn, determines the square to which the player character of the player whose turn is substituted is to move on the present turn (step S403). As the thinking routine used is the same as one heretofore used for determining a movement of a non-player character (a character of which an action is controlled by a computer process) in this kind of board game, a detailed description will be omitted.

When the square which is the movement destination of the player character of the player whose turn is substituted is determined, the CPU 12 advances the square on which the relevant player character is positioned one square in a direction of the square which is the movement destination, and stores it in the game information storage unit 33 (step S404). The CPU 12 transfers the game progress information which, as well as including the player whose turn is substituted as the player information, indicates the square to which the player character has moved, to the wireless interface device 50, causing it to be transmitted from the transmitter 54 to the participant game machines 2 which are in the connected condition (step S405).

The CPU 12 determines whether or not the square on which the relevant player character is presently positioned is the square which has been determined as the movement destination in step S403 (step S406). If the square on which the relevant player character is presently positioned is not the square which has been determined as the movement destination, the CPU 12 returns to the process of step S404, and the position of the relevant player character is moved one further square in the direction of the determined square.

When the relevant player character is moved to the square determined as the movement destination in step S403, the CPU 12 determines whether or not it is a square which needs a further instruction from the player in order to carry out a process allotted thereto (step S407). If it is not a square which needs the instruction from the player, the CPU 12 proceeds directly to a process of step S409.

If it is a square which needs the instruction from the player, the CPU 12, executing the prescribed thinking routine, selects an instruction item of the process allotted to the relevant square (step S408). As the thinking routine used is also the same as one heretofore used for determining a selection of the non-player character in this kind of board game, a detailed description will be omitted. Then, the CPU 12 proceeds to a process of step S409.

In step S409, the CPU 12 carries out a prescribed calculation in response to the process allotted to the square (the instruction item further selected in the event that the selection of the instruction item is necessary) and, as well as increasing or reducing the score of each player in accordance with a calculation result, stores the square on which the player character of the player whose turn is substituted has stopped, and the progress direction, in the game information storage unit 33. The CPU 12, furthermore, transfers the turn determination information which, as well as including the player whose turn is substituted as the player information, indicates the increase or reduction value of the score of each player, to the wireless interface device 50, causing it to be transmitted from the transmitter 54 to the participant game machines 2 which are in the connected condition (step S410). Then, the CPU 12 completes the turn substitution process, and returns to the process of the flowchart of FIG. 4.

Hereafter, a description will be given, based on a specific example, of an execution aspect of the game in the communication game system according to the embodiment. Herein, it will be presumed that the order in which the game is executed has already been determined as an order of "the host→the participant of the game machine 2-1→the participant of the game machine 2-2→the participant of the game machine 2-3", and that the game has been started. Also, in the following FIG. 8 to FIG. 10, which describe the specific example, the game machine 1 or 2 of the player whose turn it is to execute the game is indicated by a quadrilateral with a double outline, while the game machine 1 or 2 in which the communication is cut off is indicated by a x mark.

Figure 8A:
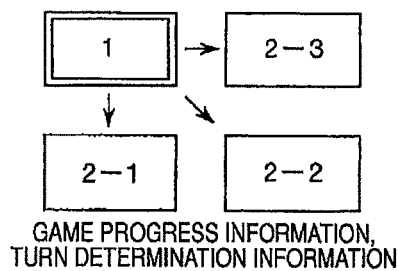
FIGS. 8A to 8G show a first example of an execution aspect of the game according to the embodiment of the invention.

FIGS. 8A to 8G show a first example of the execution aspect of the game according to the embodiment. In this example, a description is given of an execution aspect in which the game machine 1 or 2 of none of the players has the communication cut off, and the game is progressing normally. As shown in FIG. 8A, the host game machine 1, when it is the turn of the player of the host game machine 1, sequentially transmits the game progress information including the player who is the host as the player information, and the turn determination information, to each of the participant game machines 2-1 to 2-3.

Figure 8B:
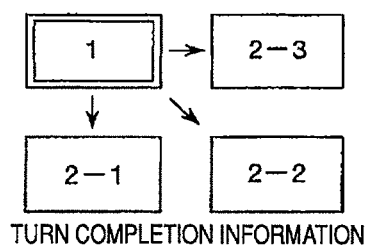
Figure 8C:
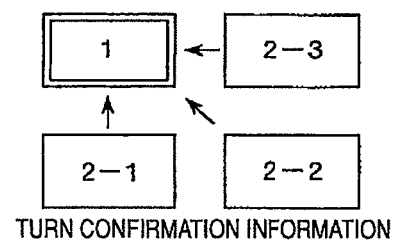

As shown in FIG. 8B, the host game machine 1, on transmitting the turn determination information, transmits the turn completion information to each of the participant game machines 2-1 to 2-3. In response to the turn completion information, as shown in FIG. 8C, each of the participant game machines 2-1 to 2-3 returns the turn confirmation information to the host game machine 1. Herein, as the turn confirmation information has been received from all of the participant game machines 2-1 to 2-3, no information relating to the participant game machine 2 in which the communication is in the cut off condition is stored in the communication management storage unit 34.

Figure 8D:
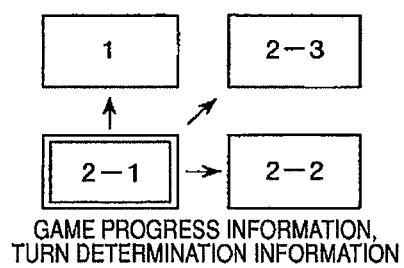

Also, in accordance with the turn completion information transmitted in FIG. 8B, as shown in FIG. 8D, a shift is made to the turn of the player of the participant game machine 2-1. As shown in FIG. 8D, the participant game machine 2-1 of the player whose turn has come, when it is the turn of the relevant player, sequentially transmits the game progress information including itself as the player information, and the turn determination information, to each of the host game machine 1 and the other participant game machines 2-2 and 2-3.

Figure 8E:
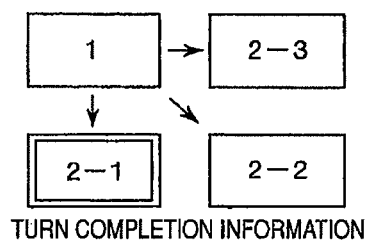
Figure 8F:
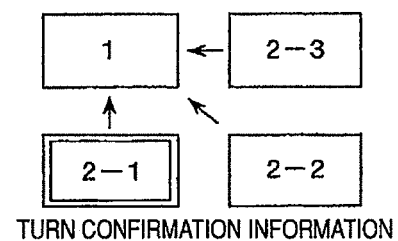

As shown in FIG. 8E, the host game machine 1, on receiving the turn determination information from the participant game machine 2-1, transmits the turn completion information to each of the participant game machines 2-1 to 2-3. In response to the turn completion information, as shown in FIG. 8F, each of the participant game machines 2-1 to 2-3 returns the turn confirmation information to the host game machine 1. Herein too, as the turn confirmation information has been received from all of the participant game machines 2-1 to 2-3, no information relating to the participant game machine 2 in which the communication is in the cut off condition is stored in the communication management storage unit 34.

Figure 8G:
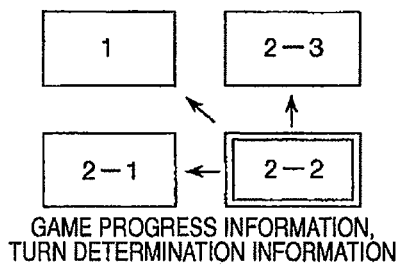

Also, in accordance with the turn completion information transmitted in FIG. 8E, as shown in FIG. 8G, a shift is made to the turn of the player of the participant game machine 2-2. Hereafter, in the same way, the game progress information, the turn determination information, the turn completion information, and the turn confirmation information are transmitted and received between the host game machine 1 and the participant game machines 2-1 to 2-3, and the game progresses while shifting to the turn of each player until the game completion condition is fulfilled.

Figure 9A:
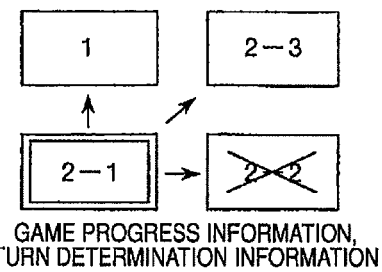
FIGS. 9A to 9G show a second example of an execution aspect of the game according to the embodiment of the invention.

FIGS. 9A to 9G show a second example of the execution aspect of the game according to the embodiment. In this example, a description is given of an execution aspect in which the communication in the participant game machine 2-2 has been cut off. As shown in FIG. 9A, the participant game machine 2-1 of the player whose turn has come, when it is the turn of the relevant player, sequentially transmits the game progress information including itself as the player information, and the turn determination information, to each of the host game machine 1 and the other participant game machines 2-2 and 2-3.

Figure 9B:
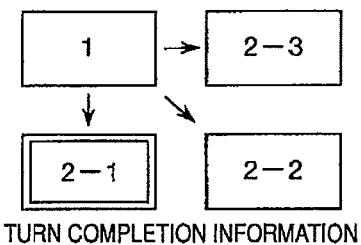
Figure 9C:
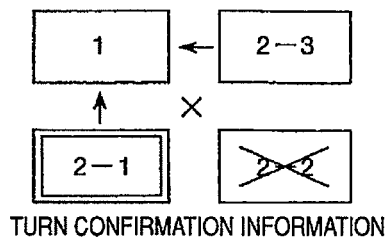

As shown in FIG. 9B, the host game machine 1, on receiving the turn determination information from the participant game machine 2-1, transmits the turn completion information to each of the participant game machines 2-1 to 2-3. In response to the turn completion information, as shown in FIG. 9C, the participant game machines 2-1 and 2-3, which are in the connected condition, return the turn confirmation information to the host game machine 1, but the participant game machine 2-2, which is in the cut off condition, being unable to receive the turn completion information, does not return the turn confirmation information to the host game machine 1. The host game machine 1, as it does not receive the turn confirmation information from the participant game machine 2-2, even though the prescribed time has elapsed since transmitting the turn completion information, stores the information indicating the matter that the participant game machine 2-2 is in the cut off condition to the communication management storage unit 34.

As the fact that the participant game machine 2-2 is in the cut off condition is stored in the communication management storage unit 34, the host game machine 1, from hereon, monitors not only whether or not its own turn has come, but also whether or not the turn of the player of the participant game machine 2-2 has come. As it is the participant game machine 2-1 which has transmitted the turn determination information in FIG. 9A, next it is the turn of the player of the participant game machine 2-2, in which the communication is in the cut off condition.

Figure 9D:
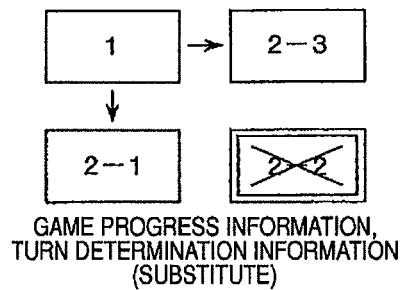

The host game machine 1, herein implementing the game on the relevant turn instead of the player of the participant game machine 2-2, as shown in FIG. 9D, transmits the game progress information including the player of the participant game machine 2-2 as the player information, and the turn determination information, to each of the participant game machines 2-1 and 2-3, which are in the connected condition, until the process of the relevant turn is completed.

Figure 9E:
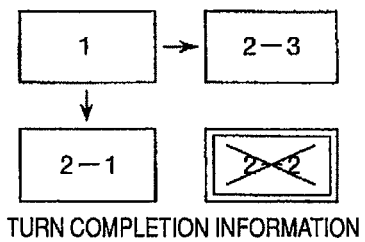
Figure 9F:
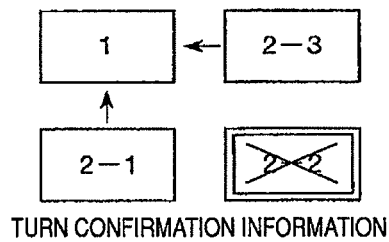
Figure 9G:
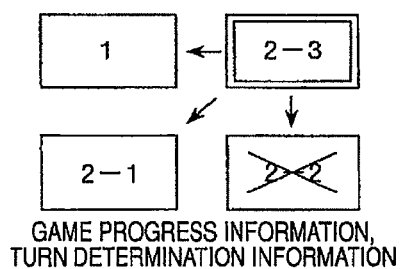

The host game machine 1, on transmitting the turn determination information on the turn carried out instead of the player of the participant game machine 2-2, as shown in FIG. 9E, further transmits the turn completion information to the participant game machines 2-1 and 2-3. In response to the turn completion information, as shown in FIG. 9F, each of the participant game machines 2-1 and 2-3 returns the turn confirmation information to the host game machine 1. Then, in accordance with the turn completion information transmitted in FIG. 9E, as shown in FIG. 9G, a shift is made to the turn of the player of the participant game machine 2-3.

Hereafter, in the same way, the game progress information, the turn determination information, the turn completion information, and the turn confirmation information are transmitted and received between the host game machine 1 and the participant game machines 2-1 and 2-3, and the game progresses while shifting to the turn of each player until the game completion condition is fulfilled. However, each time the turn of the player of the participant game machine 2-2 comes, the relevant turn of the game is carried out instead by the host game machine 1.

Figure 10A:
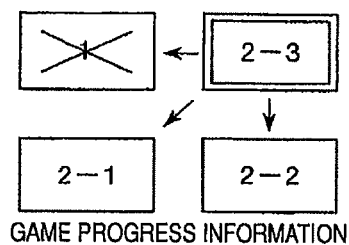
FIGS. 10A to 10C show a third example of an execution aspect of the game according to the embodiment of the invention.
Figure 10B:
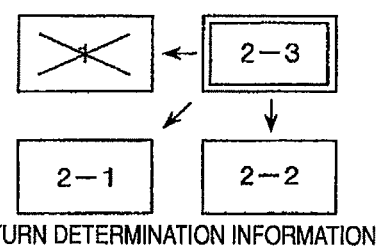
Figure 10C:
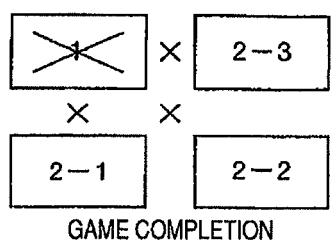

FIGS. 10A to 10C show a third example of the execution aspect of the game according to the embodiment. In this example, a description is given of an execution aspect in which the communication in the host game machine 1 has been cut off. As shown in FIG. 10A, the participant game machine 2-3 of the player whose turn has come, when it is the turn of the relevant player, sequentially transmits the game progress information including itself as the player information to each of the host game machine 1 and the other participant game machines 2-1 and 2-2.

When the process of the relevant turn has been determined, the participant game machine 2-3, as shown in FIG. 10B, transmits the turn determination information to the host game machine 1 and the other participant game machines 2-1 and 2-2. Each of the participant game machines 2-1 to 2-3 starts the timing from zero in accordance with the transmission or reception of the turn determination information. The host game machine 1, however, does not receive the turn determination information.

The host game machine 1, as it does not receive the turn confirmation information transmitted in FIG. 10B, does not transmit the turn completion information pertaining thereto. As the participant game machines 2-1 to 2-3, as shown in FIG. 10C, do not receive the turn completion information from the host game machine 1, even though the prescribed time has elapsed since the transmission or reception of the turn determination information, they cause the game to be completed directly.

As heretofore described, in the communication game system according to the embodiment, the host game machine 1, every time it transmits or receives the turn determination information, that is, every time each player's turn is completed, transmits the turn completion information to the participant game machines 2 in which the communication is in the connected condition. The host game machine 1 judges the information on the participant game machine 2 from which the turn confirmation information has not been transmitted, even though the prescribed time has elapsed since transmitting the turn completion information, as one in which the communication has been cut off, and stores the information in the communication management storage unit 34.

Herein, when the information on the participant game machine 2 in which the communication has been cut off is stored in the communication management storage unit 34, the host game machine 1 monitors whether or not the turn has come of the player of the relevant participant game machine 2 in which the communication has been cut off and, in the event that the turn of the relevant player has come, carrying out the turn substitution process, carries out the relevant turn of the game instead of the relevant player. Even in the execution of the game by the turn substitution process, in the same way as in the execution of the game by the regular turn execution process, the information relating to the progress condition of the game stored in the game information storage unit 33 of the host game machine 1 is updated, and also, the information relating to the progress condition of the game stored in the game information storage unit 33 of the participant game machines 2, in which the communication is in the connected condition and which are transmitting the game progress information and the turn determination information, is updated.

For this reason, even in the event that there exists one of the participant game machines 2-1 to 2-3 in which the communication with the host game machine 1 has been cut off, carrying over a condition of the game before the communication has been cut off, it is possible to continue the game between the host game machine 1 and the participant game machines 2 in which the communication is still in the connected condition. Also, as the turn of the player of the participant game machine 2 in which the communication is in the cut off condition is carried out instead by the host game machine 1, there is no need to prepare a replacement game machine.

Also, as the host game machine 1 determines whether or not the communication with the participant game machines 2 is intact depending on whether or not it has been possible to receive the turn confirmation information within the prescribed time after the transmission of the turn completion information, it is possible to recognize the cutting off of the communication of the participant game machines 2 by a comparatively simple process.

Also, as the turn completion information transmitted from the host game machine 1 includes the information indicating the player whose turn is next, it being sufficient to manage which player's turn comes next with the host game machine 1 alone, there is no need to manage separately in the participant game machines 2, making it possible to reduce a processing load of the participant game machines 2. Meanwhile, as well as completing the game in the event that the communication between the participant game machine 2 and the host game machine 1 is cut off, it is possible to release the participant game machine 2 from the process of managing which player's turn comes next.

In the event that there exists a participant game machine 2 in which the communication with the host game machine 1 has been cut off, the host game machine 1 carries out the turn of the player of the relevant participant game machine 2 as a substitute, by means of the execution of the prescribed thinking routine, without depending on the input operation of the player who is the host.

Heretofore, in the kind of board game applied in the embodiment, the non-player character, of which an action is decided by a complete mechanical side control, has been applied. That is, it has been considered that, even when implementing the game without depending on a control of a human, the player actually playing the game is not caused to feel a great unnaturalness. Herein, as it does not happen that the host player, by carrying out as the substitute the process of the other players by the execution of the thinking routine, plays a role of a plurality of players, it does not happen that the game is implemented at variance with an original gaming nature arising when the game is implemented exactly as though a plurality of players is plotting together.

The invention not being limited to the heretofore described embodiment, a variety of modifications and applications are possible. Hereafter, a description will be given of modification aspects of the heretofore described embodiment applicable to the invention.

In the heretofore described embodiment, a description has been given citing the board game as an example of the game executed by the communication game system to which the invention is applied. In connection with this, as long as a game is executed in which the game is executed by each player between three or more game machines which transmit and receive the information between each other, and in which the turn is decided, it is possible to apply an optional kind of game other than the board game. A mah-jong game, or a game played by three or more people such as cards or hanafuda, are games to which the invention is applicable. A kind of game in which three or more players compete in order for a record is also a game to which the invention is applicable.

In the heretofore described embodiment, the host game machine 1, after transmitting or receiving the turn determination information, has transmitted the turn completion information once only to the participant game machines 2. Then, it judges the participant game machine 2 from which the turn confirmation information has not been received, even though the prescribed time has elapsed since transmitting the turn completion information, as one in which the communication has been cut off. Naturally, it is also acceptable that the host game machine 1, between the transmission of the first turn completion information and the prescribed time elapsing, or receiving the turn confirmation information from all of the participant game machines 2, transmits the turn completion information a plurality of times. By this means, in a case in which the turn completion information is not received because of inadequate communication due to a short-term, unforeseen reason such as a noise, it will no longer be determined that the communication is in the cut off condition.

In the heretofore described embodiment, the participant game machines 2, after receiving the turn completion information form the host game machine 1, have returned the turn confirmation information once only. In connection with this, it is also acceptable that the participant game machines 2, between receiving the turn completion information and receiving some kind of next information, transmit the turn confirmation information a plurality of times. By this means, in a case in which the turn confirmation information is not received because of inadequate communication due to the short-term, unforeseen reason such as the noise, it will no longer be determined that the communication is in the cut off condition.

In the heretofore described embodiment, the host game machine 1, after transmitting or receiving the turn determination information, has transmitted the turn completion information to the participant game machines 2, while the participant game machines 2, in response to the reception of the turn completion information, have returned the turn confirmation information to the host game machine 1. Naturally, in the participant game machines 2 also, the turn determination information, which forms a stimulus for the host game machine 1 to transmit the turn completion information, should be transmitted from itself or received.

Consequently, it is also acceptable that, without the host game machine 1 transmitting the turn completion information, the participant game machine 2, after transmitting or receiving the turn determination information, transmits the turn confirmation information to the host game machine 1. In this case, it is sufficient that, judging the progress condition of the game in each of the host game machine 1 and the participant game machines 2, it judges whether or not its own turn has come. By this means, as a number of transmissions and receptions of information between the host game machine 1 and the participant game machines 2 decreases, it is possible to reduce the processing load on each of them.

In the heretofore described embodiment, the host game machine 1 has substituted for the turn of the player of the participant game machine 2 in which the communication has been cut off, as a result of the execution of the thinking routine, without depending on the operation of the player who is the host. Naturally, depending on a nature of the game, there is a kind of game which, a play by a pure internal process of a computer lacking a fairness with a play by the human, causes the player participating in the game to feel the unnaturalness. Contrarily, there is a kind of game in which, like the game in which the record is competed for in turn, just because a number of chances given to a specified player increases, even though one human plays the roles of the plurality of players, there is no problem in its establishment as the game.

Consequently, particularly in the game of this kind of nature, it is acceptable that the host game machine 1 carries out the turn execution process of FIG. 6 in step S114 also. Naturally, in the turn execution process called up in step S114, in the host game machine 1, of the information stored in the game information storage unit 33, the information relating to the progress of the game of the player whose turn is substituted is updated, while the game progress information and turn determination information transmitted to the participant game machines 2 include the player information specifying the player whose turn is substituted.

In the heretofore described embodiment, even though the communication between the participant game machines 2-1 to 2-3 is mutually intact, in the event that the communication of the host game machine 1 has been cut off, the turn of the player who is the host is not substituted, and the game has been completed at that point. However, it is possible to arrange in such a way that the process of the turn of the player who is the host is carried out instead in one of the participant game machines 2-1 to 2-3.

Figure 11A:
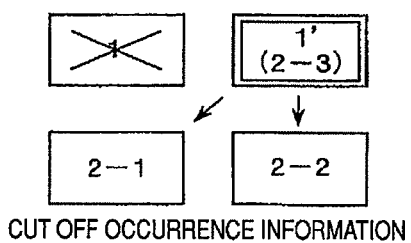
FIGS. 11A to 11D show an example of an execution aspect of the game according to a modification example of the embodiment of the invention.

FIGS. 11A to 11D show a modification example of the execution aspect of the game in the case in which the communication of the host game machine 1 has been cut off. FIGS. 11A to 11D show aspects sequentially carried out, in the modification example, after the aspect of FIG. 10B. The participant game machines 2-1 to 2-3 do not receive the turn completion information from the host game machine 1, even though the prescribed time has elapsed after the transmission or reception of the turn determination information. In this case, as shown in FIG. 11A, the participant game machine 2-3 which has sent the turn determination information transmits cut off occurrence information, which indicates a recognition of the communication cut off of the host game machine 1, to the other participant game machines 2-1 and 2-2.

Figure 11B:
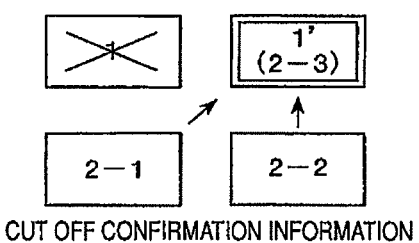

In response to the cut off occurrence information, each of the participant game machines 2-1 and 2-2, as shown in FIG. 11B, returns cut off confirmation information to the participant game machine 2-3 which has sent the cut off occurrence information. The participant game machine 2-3 which has received the cut off confirmation information from both of the other participant game machines 2-1 and 2-2, from this point, executes the process of the flowchart of FIG. 4 in place of the process of the flowchart of FIG. 5, becoming a new host game machine 1'.

Figure 11C:
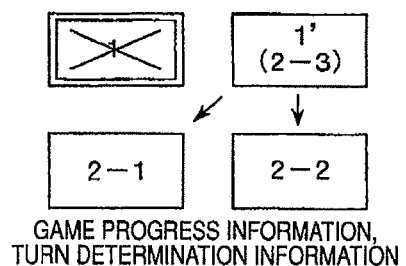
Figure 11D:
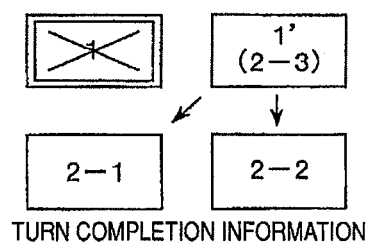

As the host game machine 1' (the participant game machine 2-2) judges at this point that the turn has come of the player who is the original host, it implements the game on the relevant turn instead of the player who has been the host first and, as shown in FIG. 11C, transmits the game progress information including the player of the host game machine 1 as the player information, and the turn determination information, to each of the participant game machines 2-1 and 2-2, which are in the connected condition, until the process of the relevant turn is completed. The host game machine 1' (the participant game machine 2-3), on transmitting the turn determination information on the turn carried out instead of the player who has been the host player, as shown in FIG. 11D, furthermore transmits the turn completion information to the participant game machines 2-1 and 2-2.

Herein, when the communication of the host game machine 1 has been cut off, it is acceptable that the participant game machine 2 which executes as the substitute the turn of the player who has been the host is fixed by means of another method other than the method shown in FIGS. 11A to 11D. For example, it is also acceptable that the turn of the player who has been the host is executed instead by the participant game machine 2 of the player whose turn comes next. Alternatively, it is also acceptable that the turn of the player who has been the host is executed instead by the participant game machine 2 of the player whose playing turn has been decided in a prescribed position (for example, a person whose turn comes first of all).

By this means, even in the event that the communication of the host game machine 1 has been cut off, as long as the communication between the other participant game machines 2-1 to 2-3 is possible, with no need to complete the game, it is possible for each participant to play the game until an end. Even without making an advance distinction between the host game machine 1 and the participant game machines 2 (although, in this case, it is necessary, as has been described as the modification example, for each game machine 1 and 2 to judge whether or not its own turn has come), by deciding in the same way as this a rule fixing the game machine 1 or 2 which executes as the substitute the turn of the player of the other game machine 1 or 2 which is in the cut off condition, it is possible to execute as the substitute in the other game machine 1 or 2.

In the heretofore described embodiment, the host game machine 1, after judging that the communication of one of the participant game machines 2 is in the cut off condition, has carried out as the substitute the turn of a user of the relevant participant game machine 2 until the game is completed. Naturally, there may be a case in which, despite the communication of the participant game machine 2 with the host game machine 1 becoming temporarily impossible due to a power cut or temporary inadequate communication, the communication with the host game machine 1 is reinstated due to a subsequent change of a condition. Also, it may also happen that, after the communication of one of the participant game machines 2 has been cut off, the game machine of a user who has not yet participated in the game comes into a condition in which the communication is possible with the host game machine 1 etc.

Thereat, it is acceptable that the host game machine 1, when the information indicating the participant game machine 2 in which the communication is in the cut off condition is stored in the communication management storage unit 34, determines whether or not the relevant participant game machine 2 has again become able to communicate. Alternatively, it is also acceptable that the host game machine 1, when the information indicating the participant game machine 2 in which the communication is in the cut off condition is stored in the communication management storage unit 34, determines whether or not the communication has newly become possible with the game machine of the user who had not yet participated in the game.

It is also acceptable that the host game machine 1, when the communication has again become possible with the participant game machine 2 in which the communication had temporarily been cut off, or when the communication has become possible with the new game machine, as well as deleting the information on the participant game machine 2 in which the communication had been in the cut off condition from the communication management storage unit 34, transmits the information indicating the progress condition of the game stored in the game information storage unit 33 to the participant game machine 2 with which the communication has again become possible, or to the game machine with which the communication has newly become possible. Subsequently, as the information on the participant game machine 2 in which the communication had been cut off has been deleted from the communication management storage unit 34, there is no need for the host game machine 1 to carry out as the substitute the turns of the other players (this, however, is in a case in which the communication of only one participant game machine 2 had been in the cut off condition).

Meanwhile, in the participant game machine 2 with which the communication has again become possible, or the game machine with which the communication has newly become possible, on the receiver 52 of the wireless interface device 50 receiving the information indicating the progress condition of the game sent from the host game machine 1, it is stored in the game information storage unit 33. Subsequently, in accordance with the information stored in the game information storage unit 33, it is possible for the game to be restarted or started.

As heretofore described, the host game machine 1 determines whether or not the communication has returned in the participant game machine 2 in which the communication has once been determined to have been cut off, in which case it sends the information stored in the game information storage unit 33 of the host game machine 1 to the participant game machines 2 and, by causing the game to be restarted from that point in the participant game machine 2 in which the communication had once been cut off, in the event that the cutting off of the communication has been due to a temporary cause, it is possible to implement the game until the end with, as far as possible, the same players. Also, it does not happen that the player of the participant game machine 2 in which the communication has been cut off due to the temporary cause is completely excluded from the game at that point, nor does it happen that the other players are made to wait for the implementation of the game in the event that the temporary cutting off of the communication occurs.

Meanwhile, the host game machine 1 determines whether or not the communication has become possible with the new game machine, in which case it sends the information stored in the game information storage unit 33 of the host game machine 1 to the game machine with which the communication has newly become possible and, by causing the game to be restarted in the relevant game machine as the participant game machine 2, it is possible to implement the game with, as far as possible, separate humans as individual players, even though they are not the players who had participated in the game from the start.

Also, in this case, in the event that the game machine, other than the host game machine 1 and the participant game machines 2-1 to 2-3 used at the start of the game, has been prepared, even in the event that the communication of a portion of the participant game machines 2 has been cut off due to a non-temporary cause (for example, a breakdown or the like), it is possible for the same player to change the game machine, and continue the game smoothly.

In the heretofore described embodiment, while the game is being carried out by the communication game system configured of the four game machines 1 and 2, each of the game machines 1 and 2 has executed only that game. Naturally, the player of each of the game machines 1 and 2 has nothing particular to do when the turns of the other players have come. Thereat, it is also acceptable to arrange in such a way that another process can be carried out in the game machines 1 and 2 during the turns of the other players. Naturally, when the turns of the other players have come also, it being simply that a screen indicating a current state of the game is not displayed on the monitor 3, it is possible to execute the processes shown in FIGS. 4 to 7 concurrently.

In the heretofore described embodiment, a description has been given of the case in which the invention is applied to the communication game system which carries out the game with a total of four game machines 1 and 2, the one host game machine 1 and the three participant game machines 2-1 to 2-3, which transmit and receive the information between each other via the wireless communication. However, the communication game system to which the invention is applicable not being limited to one configured of the four game machines, it is sufficient that it is configured of an optional number of game machines of three or more. Also, it is also acceptable that the game machines are connected to each other by wire, or furthermore that they are connected to each other via a server device. Furthermore, it is possible to apply not only the kind of portable game machine shown in FIGS. 3A and 3B, but also a stationary type designated game machine, a general-purpose computer device such as a personal computer, or furthermore a portable telephone or the like, to the game machines 1 and 2 which configure this kind of communication game system.

In the heretofore described embodiment, the program and data of the game machines 1 and 2 have been stored in the recording medium 44 and distributed. In connection with this, it is also acceptable to store the program and data in a fixed disc device included in the server device existing on an internet, and distribute them to the game machines 1 and 2 via the relevant internet. In the game machines 1 and 2, it is possible to save the program and data which the wireless interface 50 receives from the server device in the external memory device 40, and load them into the memory 30 when executing.

What is claimed is:

1. A communication game system, configured with at least three terminal devices which carry out communication between each other, in which a user of each terminal device implements a game by alternately carrying out a prescribed game input for a game progression, each of the at least three terminal devices comprising:
a processor; and
a memory including a set of executable instructions that, when executed by the processor, cause the processor to perform operations including:
determining, in accordance with information received via a communication with other terminal devices, whether a turn has come to carry out a game input;
carrying out the game input, in accordance with an operation of the user of the terminal device, when it is determined that the turn has come;
transmitting input information relating to the game input to the other terminal devices;
receiving other input information relating to another game input that has been carried out by one of the other terminal devices; and
implementing the game in accordance with one of the game input and the other input information every time the game input is carried out and every time the other input information is received, and the processor of a specified terminal device of the at least three terminal devices performs further operations comprising:
determining whether there exists, among non-specified terminal devices of the at least three terminal devices, a cut off condition in which communication has been cut off with a cut off terminal device, and whether there exists a return condition in which communication has been reestablished with the cut off terminal device; and
determining, when it is determined that there exists the cut off condition in the cut off terminal device, whether it is the turn of the cut off terminal device to carry out the game input, wherein when it is determined that it is the turn of the cut off terminal device to carry out the game input, the specified terminal device carries out a substitute game input for the cut off terminal device, transmits substitute input information relating to the substitute game input to the non-specified terminal devices, apart from the cut off terminal device, and further implements the game in accordance with the substitute game input, each of the non-specified terminal devices, apart from the cut off terminal device, receives the substitute input information, and further implements the game in accordance with the substitute input information, and when the specified terminal device determines that the return condition exists with the cut off terminal device, the specified terminal device automatically retrieves, from a storage in the specified terminal device, information indicating the progress condition of the game at a point at which the cut off condition was determined to exist, automatically sends the retrieved information to the cut off terminal device, and restarts the game from a point at which the cut off condition is determined to exist, even after the game is further implemented in accordance with the substitute game input.

2. The communication game system according to claim 1, wherein each of the non-specified terminal devices transmits confirmation information to the specified terminal device every time the game is implemented by the processor, and the specified terminal device receives the confirmation information transmitted from each of the non-specified terminal devices, wherein the specified terminal device, when there is one of the non-specified terminal devices from which the confirmation information has not been received, determines the one of the non-specified terminal devices from which the confirmation information has not been received to be the cut off terminal device.

3. The communication game system according to claim 2, wherein
the specified terminal device, when the confirmation information is received from all of the non-specified terminal devices, transmits order information to one of the non-specified terminal devices which is next in order to carry out the game input, and
each of the non-specified terminal devices is configured to receive the order information transmitted from the specified terminal device, wherein
the processor in each of the non-specified terminal devices, in accordance with the order information, determines whether the turn has come to carry out the game input.

4. The communication game system according to claim 1, wherein
the processor in each of the at least three terminal devices, in response to a progress condition of the game implemented by the processor, determines whether the turn has come to carry out the game input.

5. The communication game system according to claim 1, wherein
the specified terminal device, in accordance with an operation by the user of the specified terminal device, carries out the substitute game input for the cut off terminal device.

6. The communication game system according to claim 1, wherein
the specified terminal device, via a prescribed process executed independently of the operation by the user of the specified terminal device, carries out the substitute game input for the cut off terminal device.

7. The communication game system according to claim 1, wherein
the processor of the specified terminal device performs further operations including:
determining, after it is determined that there exists the cut off condition in the cut off terminal device, whether communication with the cut off terminal device has recovered; and
transmitting, when it is determined that the communication has recovered, and it is further determined that the cut off condition does not exist, game progress information indicating a progress condition of the game to the cut off terminal device, wherein
the processor of the cut off terminal device performs further operations including:
receiving the game progress information transmitted from the specified terminal device when the specified terminal device determines that the communication has recovered and the cut off condition does not exist; and
restarting, in accordance with the game progress information received from the specified terminal device, the implementation of the game.

8. The communication game system according to claim 7, wherein
the specified terminal device determines, when it is determined that the cut off condition exists, whether a turn has come to carry out the game input in the cut off terminal device.

9. The communication game system according to claim 1, wherein
the processor of the specified terminal device performs further operations including:
determining, after it is determined that there exists the cut off condition, whether communication is possible with a new terminal device, which has not been in a condition to carry out the communication; and
transmitting, when it is determined that the communication has become possible with the new terminal device, the game progress information indicating the progress condition of the game to the new terminal device, wherein
the new terminal device:
receives the game progress information transmitted from the specified terminal device; and
starts, in accordance with the game progress information received from the specified terminal device, the implementation of the game.

10. The communication game system according to claim 1, wherein
the other terminal devices, apart from the specified terminal device, each performs further operations including:
determining whether communication with the specified terminal device has been cut off; and
completing, in the event that it is determined that the communication with the specified terminal device has been cut off, the implementation of the game implemented by the specified terminal device.

11. The communication game system according to claim 1, wherein
a prescribed terminal device, other than the other terminal devices, apart from the specified terminal device, performs further operations including:
determining whether communication with the specified terminal device has been cut off, and whether communication with the other terminal devices, apart from the specified terminal device and the prescribed terminal device, is continuing; and
setting, when it is determined that communication with the specified terminal device has been cut off, and that communication with the other terminal devices is continuing, the prescribed terminal device as a new specified terminal device, wherein
the new specified terminal device, with the specified terminal device being the cut off terminal device, carries out the substitute game input for the cut off terminal device.

12. The communication game system according to claim 1, wherein the game is restarted from a point in the cut off terminal device, from which communication has been cut off.

13. A game device, which communicates with at least two other terminal devices, executes a game implemented between users of the at least two other terminal devices by the users alternately carrying out a prescribed game input for a game progression, the game device comprising:
a processor; and
a memory including a set of executable instructions that, when executed by the processor, cause the processor to perform operations including:
determining, in accordance with information received via a communication with the at least two other terminal devices, whether a turn has come to carry out a game input;
carrying out the game input, in accordance with an operation of the user, when it is determined that the turn has come;
transmitting input information relating to the game input to the at least two other terminal devices;

receiving other input information relating to another game input that has been carried out by one of the at least two other terminal devices, in an order in which the users carry out the game input;

implementing the game in accordance with one of the game input and the other input information every time the game input is carried out and every time the other input information is received;

determining whether there exists, among the at least two other terminal devices, a cut off condition in which communication has been cut off with a cut off terminal device, and whether there exists a return condition in which communication has been reestablished with the cut off terminal device; and determining, when it is determined that there exists the cut off condition in the cut off terminal device, whether it is the turn of the cut off terminal device to carry out the game input, wherein when it is determined that it is the turn of the cut off terminal device to carry out the game input, the processor carries out a substitute game input for the cut off terminal device, transmits substitute input information relating to the substitute game input carried out by controller to the at least two other terminal devices, apart from the cut off terminal device, and implements the game in accordance with the substitute game input, and when the return condition exists with the cut off terminal device, the processor automatically retrieves, from a storage in the specified terminal device, information indicating the progress condition of the game at a point at which the cut off condition was determined to exist, automatically sends the retrieved information to the cut off terminal device, and restarts the game from a point at which the cut off condition is determined to exist, even after the game is further implemented in accordance with the substitute game input.

14. The game device according to claim 13, wherein the game is restarted from a point in the cut off terminal device, from which communication has been cut off.

15. A game implementation method for a system configured for at least three terminal devices, including communication devices, each of which carries out transmission and a reception of information, where a user of each terminal device implements a game by alternately carrying out a prescribed game input for a game progression, the game implementation method comprising:

saving received information in a memory furnished in each of the at least three terminal devices every time a communication device receives communication information transmitted from another terminal device;

determining whether a turn has come to carry out a game input in each of the at least three terminal devices, in accordance with the communication information saved in the memory furnished in each of the at least three terminal devices;

carrying out the game input in one of the at least three terminal devices for which the turn has come, in accordance with an operation by the user of the one of the at least three terminal devices via an input device connected to the one of the at least three terminal devices;

saving game information in the one of the at least three terminal devices for which the turn has come relating to the game input in the memory of the one of the at least three terminal devices;

transmitting from the one of the at least three terminal devices in which the game input has been carried out, as the communication information, the game information relating to the game input to others of the at least three terminal devices which are carrying out the communication between each other;

determining, in a specified terminal device of the at least three terminal devices, in accordance with the communication information saved in the memory of the specified terminal device, whether there exists, among non-specified terminal devices of the at least three terminal devices, a cut off condition in which communication has been cut off with a cut off terminal device, and whether there exists a return condition in which communication has been reestablished with the cut off terminal device;

determining in the specified terminal device, when it is determined that there exists the cut off condition in the cut off terminal device, in accordance with the input information of the communication information saved in the memory of the specified terminal device, whether it is the turn of the cut off terminal device to carry out the game input;

carrying out, in the specified terminal device, when it is determined that it is the turn of the cut off terminal device to carry out the game input, in accordance with one of the operation by the user of the specified terminal device via the input device connected to the specified terminal device and a result of the specified terminal device executing a prescribed process, a substitute input as the game input for the cut off terminal device, and saving substitute game information relating to the substitute input in the memory of the specified terminal device;

transmitting the substitute game information relating to the substitute input saved in the memory from the communication device of the specified terminal device to the non-specified terminal devices, apart from the cut off terminal device; and implementing, in each of the at least three terminal devices, the game in accordance with one of the game information relating to the game input saved in the memory and the substitute game information relating to the substitute input, wherein, when it is determined that there exists the return condition with the cut off terminal device, the specified terminal device automatically retrieves, from a storage in the specified terminal device, information indicating the progress condition of the game at a point at which the cut off condition was determined to exist, automatically sends the retrieved information to the cut off terminal device, and the game is restarted from a point at which the cut off condition is determined to exist, even after the game is further implemented in accordance with the substitute game information.

16. The game implementation method according to claim 15, wherein the game is restarted from a point in the cut off terminal device, from which communication has been cut off.

17. A non-transitory computer readable medium including a program, which, when executed in a computer device, causes a communication of information to execute with at least two other computer devices, and executes a game where the users alternately carry out a prescribed game input for a game progression, the program causing the computer device to execute operations comprising:

determining, in accordance with information received via a communication with the at least two other computer devices, whether a turn has come to carry out a game input;

carrying out the game input of its own turn, in accordance with an operation of the user, when it is determined that the turn has come;

transmitting input information relating to the game input to the at least two other computer devices;

receiving other input information relating to another game input that has been input into one of the at least two other computer devices, in an order in which the users carry out the game input;

implementing the game in accordance with one of the game input and the other input information every time the game input is carried out and every time the other input information is received;

determining whether there exists, among the at least two other computer devices, a cut off condition in which communication has been cut off with a cut off computer device, and whether there exists a return condition in which communication has been reestablished with the cut off computer device;

determining, when it is determined that there exists the cut off condition, whether it is the turn of the cut off computer device to carry out the game input;

carrying, when it is determined that it is the turn of the cut off computer device to carry out the game input, out a substitute game input for the cut off computer device;

transmitting substitute input information relating to the substitute game input, as input information relating to the substitute game input in the cut off computer device, to the at least two other computer devices, apart from the cut off computer device, wherein the game is implemented in accordance with the substitute game input and each of the at least two other computer devices, apart from the cut off computer device, implements the game in accordance with the substitute input information, and when the return condition exists with the cut off computer device, a specified terminal device automatically retrieves, from a storage in the specified terminal device, information indicating the progress condition of the game at a point at which the cut off condition was determined to exist, automatically sends the retrieved information to the cut off terminal device, and the game is restarted from a point at which the cut off condition is determined to exist, even after the game is further implemented in accordance with the substitute game input.

18. The non-transitory computer readable medium according to claim 17,
wherein the game is restarted from a point in the cut off terminal device, from which communication has been cut off.

19. A non-transitory computer readable recording medium recording a program, executed in a computer device carrying out a communication of information with at least two other computer devices, for executing a game implemented between users of relevant at least two other computer devices by the users alternately carrying out a prescribed game input for a game progression, the program causing the computer device to function as:

a processor which determines, in accordance with information received via a communication with the at least two other computer devices, whether a turn has come to carry out a game input;

the processor which further carries out the game input, in accordance with an operation of the user, when it is determined that the turn has come;

a transmitter which transmits input information relating to the game input carried out by the processor to the at least two other computer devices;

a receiver which receives other input information relating to another game input that has been carried out by one of the at least two other computer devices, in an order in which the users carry out the game input;

the processor which further implements the game in accordance with one of the game input and the other input information every time the game input is carried out and every time the receiver receives the other input information;

the processor which further determines whether there exists, among the at least two other computer devices, a cut off condition in which communication has been cut off with a cut off computer device, and whether there exists a return condition in which communication has been reestablished with the cut off computer device;

the processor which further determines, when it is determined that there exists the cut off condition in the cut off computer device, whether it is the turn of the cut off computer device to carry out the game input;

the processor which, when it is determined that it is the turn of the cut off computer device to carry out the game input, further carries out a substitute game input for the cut off computer device;

the processor which further transmits substitute input information relating to the substitute game input to the at least two other computer devices, apart from the cut off computer device, wherein the processor implements the game in accordance with the substitute game input and each of the at least two other computer devices, apart from the cut off computer device, implements the game in accordance with the substitute input information, and when the return condition exists with the cut off computer device, the processor automatically retrieves, from a storage in the specified terminal device, information indicating the progress condition of the game at a point at which the cut off condition was determined to exist, automatically sends the retrieved information to the cut off terminal device, and restarts the game from a point at which the cut off condition is determined to exist, even after the game is further implemented in accordance with the substitute game input.

20. The non-transitory computer readable medium according to claim 19,
wherein the game is restarted from a point in the cut off terminal device, from which communication has been cut off.

* * * * *